(12) United States Patent
Stadie et al.

(10) Patent No.: US 11,841,711 B2
(45) Date of Patent: Dec. 12, 2023

(54) CONTROLLER AND METHOD FOR TRANSPORTING DEVICES

(71) Applicant: Ocado Innovation Limited, Hatfield (GB)

(72) Inventors: Robert Stadie, Hatfield (GB); Matthew Whelan, Hatfield (GB); Gareth Siret, Hatfield (GB)

(73) Assignee: OCADO INNOVATION LIMITED, Hatfield (GB)

(*) Notice: Subject to any disclaimer, the term of this patent is extended or adjusted under 35 U.S.C. 154(b) by 753 days.

(21) Appl. No.: 16/961,082

(22) PCT Filed: Jan. 15, 2019

(86) PCT No.: PCT/IB2019/050297
§ 371 (c)(1),
(2) Date: Jul. 9, 2020

(87) PCT Pub. No.: WO2019/138392
PCT Pub. Date: Jul. 18, 2019

(65) Prior Publication Data
US 2020/0363819 A1    Nov. 19, 2020

(30) Foreign Application Priority Data
Jan. 10, 2018    (GB) .................................... 1800408

(51) Int. Cl.
*G06F 7/00* (2006.01)
*G05D 1/02* (2020.01)
(Continued)

(52) U.S. Cl.
CPC ......... *G05D 1/0291* (2013.01); *B65G 1/0464* (2013.01); *G05B 19/4155* (2013.01);
(Continued)

(58) Field of Classification Search
CPC ............... G05D 1/0291; G05D 1/0214; G05D 2201/0216; G05D 1/0297; B65G 1/0464;
(Continued)

(56) References Cited

U.S. PATENT DOCUMENTS

| | | | |
|---|---|---|---|
| 8,412,400 B2* | 4/2013 | D'Andrea | G05D 1/0291 701/28 |
| 2007/0294029 A1* | 12/2007 | D'Andrea | G01C 21/005 701/410 |

(Continued)

FOREIGN PATENT DOCUMENTS

| | | |
|---|---|---|
| EP | 3355255 A1 | 8/2018 |
| JP | H03276212 A | 12/1991 |

(Continued)

OTHER PUBLICATIONS

Office Action dated Nov. 19, 2021, by the Korean Patent Office in corresponding Korean Patent Application No. 10-2020-7022947. (6 pages).
Office Action dated Nov. 19, 2021, by the Great Britain Patent Office in corresponding Great Britain Patent Application No. GB1800408.5. (4 pages).

(Continued)

*Primary Examiner* — Yolanda R Cumbess
(74) *Attorney, Agent, or Firm* — BUCHANAN INGERSOLL & ROONEY PC

(57) ABSTRACT

A controller is provided to control movement of transporting devices. Embodiments limit the loads imparted on a grid of pathways structure of transporting devices to prevent non-safety-critical damage from excess loads and/or fatigue. A controller is arranged to control movement of transporting devices arranged to transport containers stored in a facility. The facility includes pathways arranged in cells to form a grid-like structure which extends in first and second directions. A route determination unit determines a route from one location to another, and a clearance unit to provide clearance for each transporting device to traverse a portion of the determined route. A constraint area determination unit (Continued)

determines constraint areas based on the grid-like structure and a calculation unit calculates a constraint limit in each constraint area.

34 Claims, 12 Drawing Sheets

(51) Int. Cl.
| | | |
|---|---|---|
| *B65G 1/04* | (2006.01) | |
| *G05B 19/4155* | (2006.01) | |
| *G06Q 10/047* | (2023.01) | |
| *G06Q 50/28* | (2012.01) | |
| *G06N 7/01* | (2023.01) | |

(52) U.S. Cl.
 CPC ............ *G05D 1/0214* (2013.01); *G06N 7/01* (2023.01); *G06Q 10/047* (2013.01); *G06Q 50/28* (2013.01); *G05B 2219/32029* (2013.01); *G05D 2201/0216* (2013.01)

(58) Field of Classification Search
 CPC .......... B65G 1/1378; B65G 2201/0235; G05B 19/4155; G06N 7/01; G06Q 10/047; G06Q 50/28; G06Q 10/08; G06Q 10/087; Y02P 90/02
 USPC .......................................... 700/213–216, 218
 See application file for complete search history.

(56) References Cited

U.S. PATENT DOCUMENTS

| | | | |
|---|---|---|---|
| 2011/0060449 A1* | 3/2011 | Wurman | ............ G05B 19/4189 700/218 |
| 2012/0189410 A1 | 7/2012 | Toebes et al. | |
| 2013/0302132 A1 | 11/2013 | D'Andrea et al. | |
| 2015/0310366 A1 | 10/2015 | Yu et al. | |
| 2016/0300186 A1 | 10/2016 | Scharaswak et al. | |
| 2018/0057263 A1 | 3/2018 | Beer | |
| 2018/0075402 A1 | 3/2018 | Stadie et al. | |

FOREIGN PATENT DOCUMENTS

| | | |
|---|---|---|
| KR | 20170013973 A | 2/2017 |
| NO | 317366 B1 | 10/2004 |
| WO | 9849075 A1 | 11/1998 |
| WO | 2015019055 A1 | 2/2015 |
| WO | 2015185628 A2 | 12/2015 |

OTHER PUBLICATIONS

Office Action (Examination Report No. 1) dated Jul. 7, 2022, by the Australian Patent Office in corresponding Australian Patent Application No. 2021203812. (3 pages).
Office Action (Notice of First Review Opinion) dated Feb. 7, 2023, by the State Intellectual Property Office of People's Republic of China in corresponding Chinese Patent Application No. 201980007667.5 and an English translation of the Office Action. (23 pages).
Office Action (Examination report No. 3 for standard patent application) dated Jan. 18, 2023, by the Australian Government, IP Australia in corresponding Australian Patent Application No. 2021203812. (3 pages).
Office Action (Examination Report No. 2) dated Nov. 8, 2022, by the Australian Patent Office in corresponding Australian Patent Application No. 2021203812. (3 pages).
Office Action dated Sep. 28, 2021, by the Great Britain Patent Office in corresponding Great Britain Patent Application No. GB1800408.5. (5 pages).
"Structural Safety of Automatic High Bay Warehouse Under Impact Loads Cause by Shelf Access Equipment", (Doctor's Thesis, TU Munich), Huebner, published Oct. 13, 2010. (195 pages).
"EN 1999-1-1:2007 (English): Eurocode 9: Design of Aluminum Structures—Part 1-1: General Structural Rules", Jun. 2009. (211 pages).
"EN 1999-1-3:2007 (English): Eurocode 9: Design of Aluminum Structures—Part 1-3: Structures Susceptible to Fatigue", Aug. 2011. (105 pages).
Office Action (Communication of a Notice of Opposition) dated Dec. 15, 2022, by the European Patent Office in corresponding European Patent Application No. 19709770.2. (19 pages).
International Search Report (PCT/ISA/210) dated Apr. 25, 2019, by the European Patent Office as the International Searching Authority for International Application No. PCT/IB2019/050297.
Written Opinion (PCT/ISA/237) dated Apr. 25, 2019, by the European Patent Office as the International Searching Authority for International Application No. PCT/IB2019/050297.
Office Action dated Jun. 29, 2021, by the Canadian Intellectual Property Office in corresponding Canadian Patent Application No. 3,083,630. (4 pages).
The extended European Search Report dated May 19, 2022, by the European Patent Office in corresponding European Application No. 22153655.0. (10 pages).
Office Action (Examination Report No. 4) dated May 2, 2023, by the Australian Patent Office in corresponding Australian Patent Application No. 2021203812. (2 pages).
Office Action (Request for the Submission of an Opinion) dated Apr. 3, 2023, by the Korean Patent Office in corresponding Korean Patent Application No. 10-2022-7028331, and an English Translation of the Office Action. (4 pages).
Office Action dated Feb. 20, 2023, by the Canadian Patent Office in corresponding Canadian Patent Application No. 3,083,630. (3 pages).

\* cited by examiner

CONTROLLER AND METHOD FOR TRANSPORTING DEVICES

This application claims priority from UK Patent Application No. GB1800408.5 filed 10 Jan. 2018, the content of all of this application hereby being incorporated by reference.

TECHNICAL FIELD

The present invention relates generally to the field of controlling transporting devices. More specifically to an apparatus and method for controlling movement of transporting devices based on constraints.

BACKGROUND

Certain commercial and industrial activities require systems that enable the storage and retrieval of a large number of different products. One known system for the storage and retrieval of items in multiple product lines involves arranging storage bins or containers on rows of shelves arranged in aisles. Each bin or container holds one or more products of one or more product types. The aisles provide access between the rows of shelves, so that the required products can be retrieved by operatives or robots that circulate in the aisles. It will be appreciated, however, that the need to provide aisle space to access the products means that the storage density of such systems is relatively low. In other words, the amount of space actually used for the storage of products is relatively small compared to the amount of space required for the storage system as a whole.

For example, online retail businesses selling multiple product lines, such as online grocers and supermarkets, require systems that are able to store tens or even hundreds of thousands of different product lines. The supply chains and warehouse operations of these businesses are highly dependent on their ability to organise, retrieve and return items to various containers.

In particular implementations of various warehouse and storage facility designs, containers may be stacked on top of one another and the stacks may be arranged in rows. The containers may then be accessed from above, removing the need for aisles between the rows and allowing more containers to be stored in a given volume or area.

In WO-A2-2015/185628, which is incorporated herein by reference, the containers are accessed by one or more robotic or automated means, which navigate through a grid of pathways to access containers for a variety of different operations, such as moving a container from one location to another for handling, conducting operations upon a container, returning a container to a position in a warehouse, etc.

The co-ordination of the movement of the one or more robotic or otherwise automated means may be an important consideration in determining the overall efficiency and scalability of a system for storage and retrieval of a large number of different products.

However, existing solutions are not "safety rated"; so that movement functions cannot be relied on for any human safety. Human safety must be guaranteed by the integrity of the grid of pathways structure. However, no solutions exist to limit robotic movement based on the loading and/or fatigue of the grid of pathways.

SUMMARY

In view of the problems, the present invention aim to provide an apparatus and method for such a robotic movement system which limits the loads imparted on the grid of pathways structure by the robotic movement means to prevent non-safety-critical damage from excess loads and/or fatigue.

In general terms, the invention introduces a controller which limits the load and/or fatigue of the grid of pathways when deciding upon robotic movement.

According to the present invention there is provided a controller arranged to control movement of a plurality of transporting devices. The plurality of transporting devices are arranged to transport containers, the containers being stored in a facility, the facility arranged to store the containers in a plurality of stacks. The facility comprises a plurality of pathways arranged in cells so as to form a grid-like structure above the stacks, wherein the grid-like structure extends in a first direction and in a second direction, the plurality of transporting devices arranged to operate on the grid-like structure. The controller comprises a route determination unit arranged to determine a route from one location on the grid-like structure to another location on the grid-like structure for each transporting device and a clearance unit arranged to provide clearance for each transporting device to traverse a portion of the determined route. The controller also comprises a constraint area determination unit arranged to determine a plurality of constraint areas based on the grid-like structure and a calculation unit arranged to calculate a constraint limit in each constraint area. At least one of: the clearance unit is further arranged to grant or withhold clearance to a transporting device to traverse a portion of the determined route based on the calculated constraint limit in the particular constraint area, and the route determination unit is further arranged to determine a route for a transporting device from one location to another location traversing or not traversing a particular constraint area based on the calculated constraint limit in the particular constraint area.

The present invention also provides a storage system. The storage system comprises a first set of parallel rails or tracks extending in the X-direction, and a second set of parallel rails or tracks extending in a Y-direction transverse to the first set in a substantially horizontal plane to form a grid pattern comprising a plurality of grid spaces. The storage system also comprises a plurality of stacks of containers located beneath the rails, and arranged such that each stack is located within a footprint of a single grid space. Moreover, a multiplicity of load handling devices, each load handling device being arranged to selectively move laterally in the X and Y directions, above the stacks on the rails. The storage system also comprises a controller as described previously.

The present invention also provides a method of controlling movement of a plurality of transporting devices. The plurality of transporting devices are arranged to transport containers, the containers being stored in a facility, the facility arranged to store the containers in a plurality of stacks. The facility comprises a plurality of pathways arranged in cells so as to form a grid-like structure above the stacks, wherein the grid-like structure extends in a first direction and in a second direction, the plurality of transporting devices arranged to operate on the grid-like structure. The method comprises the steps of determining a plurality of constraint areas based on the grid-like structure and calculating a constraint limit in each constraint area. The method further comprises the steps of determining a route for each transporting device from one location on the grid-like structure to another location on the grid-like structure traversing or not traversing a particular constraint area and granting or withholding clearance to each transporting device to traverse a portion of a determined route. Moreover, at least one of the determining a route step or the clearance step is based on the calculated constraint limit in the particular constraint area.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 1:
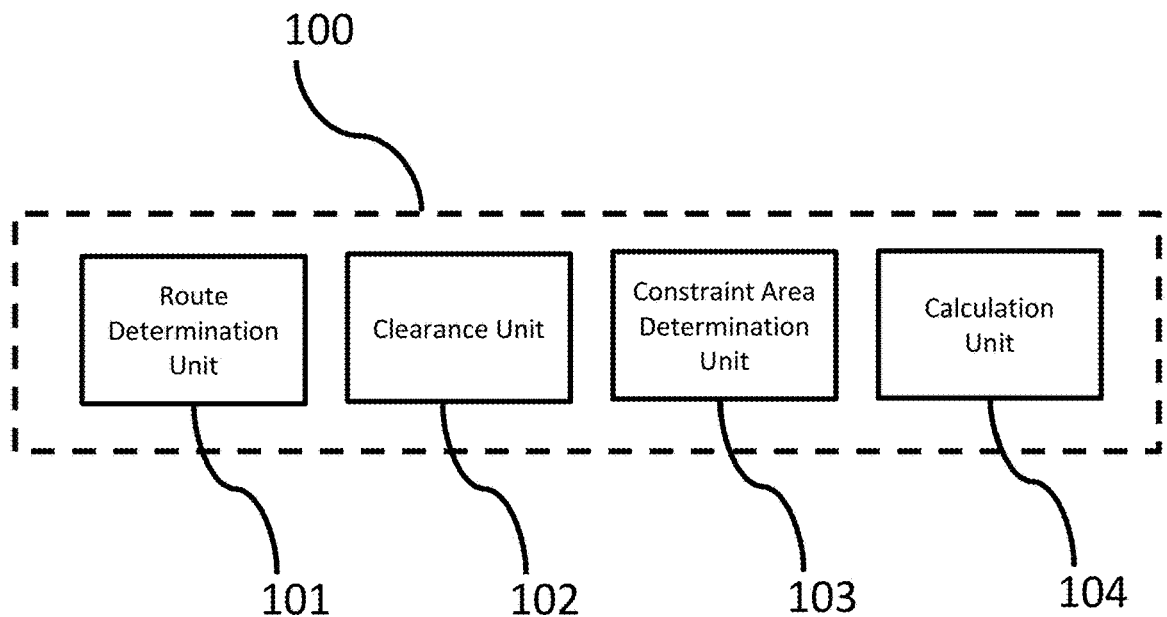
FIG. 1 is a schematic diagram of a controller according to a first embodiment of the present invention.

FIG. 1 depicts a controller according to the first embodiment of the present invention. The controller may be a standalone component.

The controller may be arranged but non-limited to operating in a fully- and semi-automatic goods storage and retrieval systems. Various aspects of which may sometimes be referred to as "order fulfillment," "storage and retrieval," and/or "order picking" systems, can be implemented in a wide variety of types and forms. One manner of providing access to goods stored for fully- and/or semi-automatic retrieval, for example, comprises placement of goods, which may be of any desired type(s), in bins or other containers (hereinafter referred to generically as containers), and stacking and/or otherwise disposing the containers in racking or vertically in layers, such that individual containers may be accessible by wholly or partially-automated container retrieval systems. In some embodiments, the systems may include systems beyond goods storage and retrieval, such as systems where goods are processed, repaired, manipulated, assembled, sorted, etc., and the movement of goods, products, parts, components, subcomponents is required, both within a facility and/or to other facilities or transportation. For the purposes of this specification, a storage facility for the storage, retrieval, processing and/or fulfillment of orders, wherein access to such goods is provided by fully or semi-automatic retrieval, is referred to as a "hive". The "hive" may be comprised of a grid-like layout of the potential pathways for the movement of robotic elements or devices ("robot" or "transporting device") to traverse and perform operations at various locations in the "hive" (referred to as the "grid" or "grid-like structure").

The specification is not limited to only systems that have "hives", "grids", and/or "robots", but systems that broadly control and/or coordinate the movement and/or activities of a plurality of devices may also be contemplated. These devices may be configured for the transportation of various items, such as goods and/or products, and/or containers that may be empty and/or holding such goods and/or products. These devices may further be involved in the fulfillment of orders but may also be involved in any other type of activity, such as transporting containers to and from workstations, moving objects from source locations to target locations, etc.

As indicated, the devices may be robots, and the devices may be configured to move around a hive, and/or communicate with a control system to coordinate/receive instructions on their movement. In some embodiments, the devices may be configured to communicate amongst themselves, and/or coordinate movement amongst themselves. Accordingly, the devices may have various transporting means, communications means, powering means, processing means, processor means, sensor means, monitoring means, on-board workstations, electronic/physical storage means and/or lifting/transporting means (such as a winch, arms, etc.).

While the devices may be configured to receive instructions from the system, there may be situations where the devices lose communications with the system, have degraded communications pathways and/or do not receive communications from the system within a particular time frame. In some embodiments, the devices may also be configured to communicate amongst each other, and/or sense the presence of each other. These communications and/or sensory inputs may be utilized, for example, in crowdsourcing information about the environment, providing redundant communications channels, verifying instructions, etc. Fulfillment of orders may include various operations, such as, but not limited to: assembling orders where various products are purchased and aggregated for delivery to a customer, such as for a grocery chain; assembling products with various sub-components; conducting various operations on products (such as soldering components together), sorting products, etc. Orders may also be returned, for example, if an order is cancelled, a delivery fails, etc. In some scenarios, while an order is in the process of fulfillment within the hive, it may be cancelled and the product items may need to be returned. In some scenarios, the items may need to be placed again into containers, and the containers moved to various locations. In some scenarios, a workstation may need to conduct tasks to reject/rework products when an order is returned or cancelled.

Furthermore, as mentioned above, individual containers may be in vertical layers, and their locations in the "hive" may be indicated using co-ordinates in three dimensions to represent the robot or a container's position and a container depth (e.g. container at (X, Y, Z), depth W). In some embodiments, locations in the "hive" may be indicated in two dimensions to represent the robot or a container's position and a container depth (e.g. container at (X, Y), depth Z).

The "hive" itself may be a "dynamic" environment, in the sense that robots and workstation locations may be associated with different parts of the hive for engaging in actions. For example, robots may need to access a specific container in a specific location in the hive dimensions (e.g. container at (X, Y, Z), depth W) to fulfil a particular order or to store a product in the "hive". This involves movements of the robots along various possible paths, for example, along the top of the grid, and then accessing particular containers at selected depths of a stack.

The access of particular containers at selected depths of a stack may necessitate the movement of containers which may otherwise obstruct the ability to access a particular container (e.g. where the containers are stacked, a number of containers must be moved first to be able to access a container that is not at an accessible end of the stack). In some embodiments, it may be advantageous to have the system configured to provide for the evaluation and optimisation of a new position for every container that has to be removed to access a target container.

Containers moved off of a stack are not moved back to their original stack positions but are placed in optimised positions. One of the potential advantages is the ability to modify the distribution of containers such that the containers are located in more easily accessible or otherwise more convenient locations.

This may help maintain an optimal distribution of containers within the facility, for example, biasing containers that are expected to be in higher demand in more easily accessible locations, such as locations nearby or within workstations, to reduce travel distance.

Robots may have various shapes, sizes and configurations, and may have various communications means, sensors and tools. In some embodiments, each robot may be able to communicate with the control system through a set of frequency channels established through a set of base stations and base station controllers. Robots may utilize various tools to move and obtain containers from a stack, including, for example, a winch to carry a container. The grid is not limited to rectangular grid elements and may be comprised of curved tracks, tracks up and down, etc. The grid pathways may have intersections and may be accessed by more than one robot Each grid may be segmented, physically or logically, into one or more sub-grids. The grid may be comprised of one or more workstations. Workstations may be manual, semi-automated or fully automated, and may consist of locations or areas where operations are conducted within the hive, or operations are conducted in relation to the hive, containers or products, such as, moving products in or out of the hive, manufacturing products, assembling products, processing products to their components, providing staging locations to support other steps or operations, etc.

Workstations could include, for example, locations where items are moved from inbound carriers, locations where products have various operations conducted on them (e.g. assembly of components, painting, sorting, packaging, disassembly, reworking products, fixing packaging, replacing products in cancelled orders, rejecting returned products, disposing products), products are moved to outbound carriers, locations with capabilities for refrigeration, locations where components or objects are assembled, locations used for staging or pre-fetching products, locations where robots are repaired and maintained, locations where robots are charged, locations where workers "pick" products to be placed into containers, locations where workers "pick" products to be removed from containers in fulfillment of orders, bags are placed into containers, etc.

Where items/products are returned to the hive, the system may support and/or control the process of bringing back the product, reworking the product, and/or disposing the product if rejected. The scenario may, in some embodiments, involve processing the returned container (which may be a delivery tote or other object as well) at a workstation to determine whether it can be accepted back into the system, whether it needs reworking/repackaging, and/or whether the product should be disposed of instead (e.g. a perishable product has expired).

Workstations may have one or more workers or robots present to conduct various tasks, such as picking items for fulfillment of orders.

In some embodiments, workstations may also be stations with conveyors, refrigerators, various tooling technologies and/or other technology to manipulate, paint, fasten, repair, freeze, heat, expose to chemicals, refrigerate, filter, assemble, disassemble, sort, package, scan, test, transport, store or process goods, containers, etc.

The workstations may have their own pathways within the facility, share pathways with the facility, etc. The workstations may also have various input and output pathways or other types of entry/egress points within the facility.

In some embodiments, the workstations communicate with one or more warehouse management systems to provide information and data related to the status of the workstation, workflow, required containers, issues, status of products held or otherwise manipulated (e.g. sub-components being assembled together), etc.

With specific reference to the features of the first embodiment. The controller is arranged to control the transporting devices which are arranged to transport containers. With reference to FIG. 1, the controller 100 comprises a route determination unit 101, a clearance unit 102, a constraint area determination unit 103 and a calculation unit 104.

The route determination unit 101 is arranged to determine a route from one location on the grid to another location on the grid for each transporting device. More specifically, a transporting device may start from an origin location and need to traverse the grid to a target location. In this regard, the route determination unit 101 may determine the route necessary to traverse the grid based on any number of factors, such as locations of other transporting devices, routes determined for other transporting devices and other factors external to the transporting device as well as factors internal to the transporting device such as battery charge level, acceleration profile, deceleration profile as well as the shortest distance between the origin and the target across the grid.

The clearance unit 102 is arranged to provide clearance for each transporting device to traverse a portion of the determined route. Due to imprecise measurements of each transporting device, for example, due to differing acceleration profiles between transporting devices or different speeds of transporting devices and other errors, such as communication loss and transporting device failure, the exact position of each transporting device is not known at a given moment. Therefore, it is necessary to account for these imprecise measurements. For this reason, a clearance unit 102 is used to clear a portion of a determined route for the transporting device so that the transporting device only traverses a portion of the route at a time. For example, for a straight section of determined route ten grid cells in length, the clearance unit may be arranged to clear the transporting device to traverse only three of the grid cells at one time by determining, based on the amount of time the transporting device will need to traverse three grid cells, whether the next three grid cells are clear for traversal and thereby permit the transporting device to proceed. For example, clearance may be determined based on whether other transporting devices are expected to conflict on the same grid cells at the same time. As will be appreciated, clearance occurs such that as each grid cell is successfully traversed by the transporting device, the next grid cell of the cleared section is cleared for traversal by the transporting device. In another example, where a direction change is required by the transporting device, the transporting device may be cleared up to the corner at which the transporting device is required to perform the direction change. In this way, portions of the determined route are cleared, portion by portion, for traversal by the transporting device.

In a preferred embodiment, the present inventors have found a preferred manner to mostly account for the compounded error although a clearance unit 102 is needed to provide clearance for a transporting device to transverse a portion of the determined route. In particular, a transporting device moving from an origin to a target on the grid accomplishes this movement with one or more legs. In other words, the determined route is broken up into one or more legs, each of which has its compounded error reset at the start of each leg. Each leg is a traversal in either constant first direction (for example, in a constant X-direction) or a constant second direction (for example, a constant Y-direction). The controller 100 is arranged to allow sufficient tolerance on each leg to allow for the non-erroneous statistical variation in transporting device performance over the transporting device population; in terms of first/second direction translation; wheel change; and internal clock variation; as wheel as potential transmission delays of transporting device commands to the transporting devices and status messages from the transporting devices. Thereby the determined route provides sufficient time tolerance to allow (non-erroneous) transporting devices arriving late at the end of one leg to start the next leg at the planned time thereby addressing the accumulated error. For transporting device arriving at the end of a leg early; the transporting device simply waits until the nominal start time of the following leg; before starting that leg.

The constraint area determination unit 103 is arranged to determine a plurality of constraint areas based on the grid. In particular, the constraint area determination unit 103 may be arranged to determine constraint areas as portions of the entire grid, or the entire grid itself. The constraint determination unit 103 may be arranged to determine areas as a predetermined number of grid cells in a first direction and a second predetermined number of grid cells in a second direction, for example, ten grid cells in a first direction and five grid cells in a second direction. Similarly, if the grid were 20 cells in a first direction and 20 cells in a second direction, the constraint determination unit 103 may determine a constraint area with 20 cells in the first direction and 20 cells in the second direction, thereby encompassing the entire grid.

The plurality of constraint areas may be arranged to overlap with at least one other constraint area. Moreover, the constraint area determined may be based on a structural analysis and/or a fatigue analysis of the grid so as to identify areas of the grid more susceptible to structural/fatigue failure if overloaded. Similarly, the constraint areas may instead/additionally be determined based on a structural analysis and/or a fatigue analysis of any mezzanines or peripherals associated with the grid. For example, the grid may have a number of levels providing services or support to the grid. Similarly, the grid may further comprise peripherals which, for example, allow transporting devices to retrieve containers from locations outside of the grid and/or deposit containers for locations outside of the grid. The peripherals may be arranged to remove/deposit containers from/onto the grid.

Thereby, by use of constraint areas, sections of the grid are identified which are susceptible to excess load and/or fatigue. More specifically, static loading, dynamic loading and/or shear loading may each be considered in the determination of constraint areas.

The calculation unit 104 is arranged to calculate a constraint limit in each constraint area. In one non-limiting example, the calculation unit 104 is arranged to calculate the constraint limit as the number of transporting devices in a constraint area. For example, the calculation unit 104 calculates the number of transporting devices currently located in a particular constraint area. In another non-limiting example, the calculation unit 104 may be arranged to calculate the number of transporting devices moving and/or accelerating in a first or second direction in a particular constraint area. Alternatively or additionally, the calculation unit 104 may be arranged to calculate an expected force acting on a constraint area based on the number of transporting devices accelerating or decelerating in a first or second direction in a particular constraint area.

Based on the constraint limit calculated by the calculation unit 104 at least one of the clearance unit and/or the route determination unit is arranged to perform a further action.

In particular, in one non-limiting embodiment, the clearance unit is further arranged to grant or withhold clearance to a transporting device to traverse a portion of the determined route based on the calculated constraint limit in the particular constraint area. More specifically, as explained previously, the clearance unit is arranged to provide clearance for a transporting device. However, based on the constraint limit in the particular constraint area, the clearance unit may grant or withhold clearance. For example, for a transporting device with a route determined through a particular constraint area, if the constraint limit for that particular constraint area is determined to be greater than or equal to a predetermined threshold then the clearance unit may be arranged to withhold clearance for the transporting device to traverse the particular constraint area. In this way, the transporting device is prevented from entering a constraint area whose constraint limit—related to loading and/or fatigue of the constraint area—is greater than or equal to a predetermined threshold. When the constraint area is less than the predetermined threshold then the clearance unit may be arranged to grant clearance, at the appropriate time, for the transporting device to traverse the constraint area. In this way, the transporting device is able to traverse the constraint area because the constraint area is not loaded to/over its maximum rating. The present inventors envisage that the clearance need not be granted/withheld on the edge of a constraint area. Instead, clearance may be withheld/granted before the transporting device reaches the constraint area. For example, if the next grid cell to be cleared for the transporting device is inside the constraint area but the transporting device itself is still a number of grid cells away from the constraint area then the clearance unit may withhold clearance if the constraint limit is greater than or equal to a predetermined threshold.

In another non-limiting embodiment, the route determination unit 101 is further arranged to determine a route for a transporting device from one location to another location traversing or not traversing a particular constraint area based on the calculated constraint limit in the particular constraint area. More specifically, as explained previously, the route determination unit 101 is arranged to determine a route from an origin to a target on the grid. However, when the constraint limit is, for example, greater than or equal to a predetermined threshold then the route determination unit may be arranged to determine a route not traversing the constraint area with the excess constraint limit. On the other hand, when the constraint limit for a particular constraint area is less than the predetermined threshold then the route determination unit 101 may be arranged to determine a route traversing the particular constraint area or allow the transporting device to continue along the already determined route. In this way, routes may be determined to not traverse a particular constraint area because the constraint area is loaded to/over its maximum rating.

Figure 2:
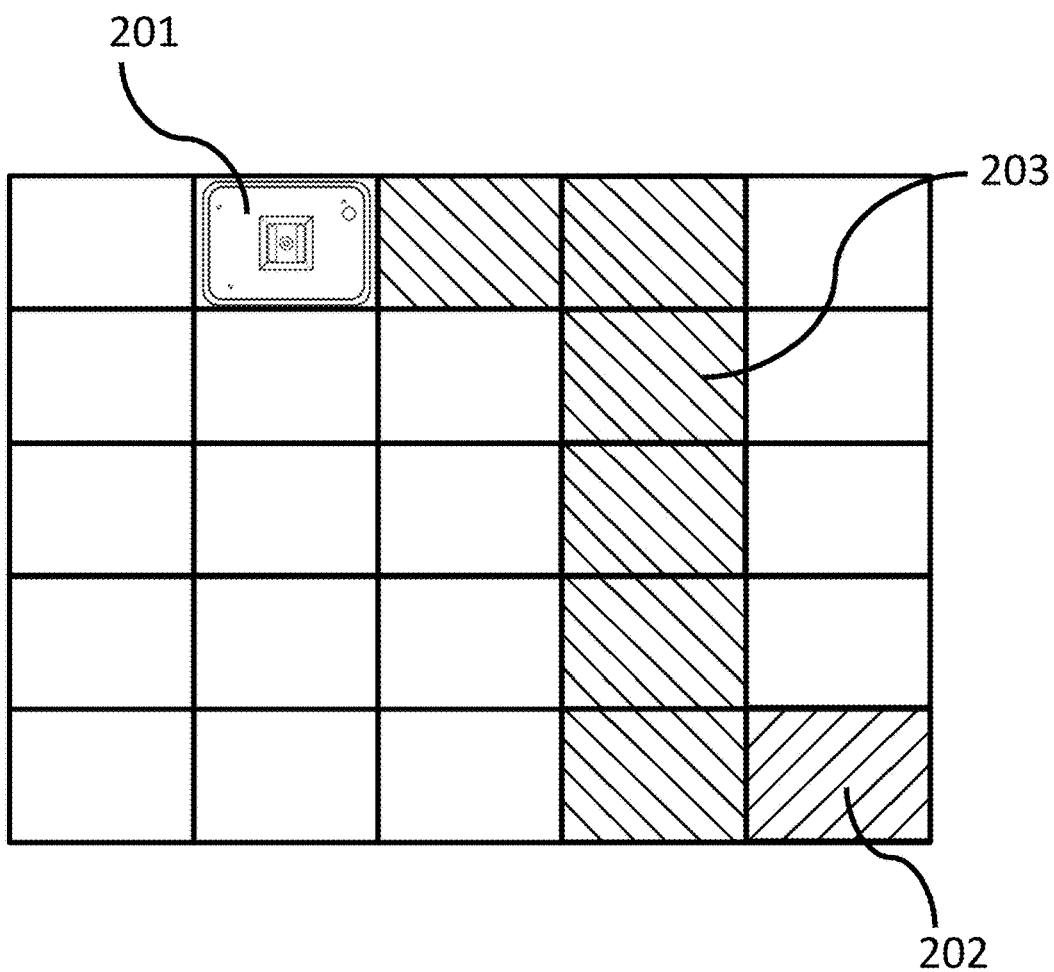
FIG. 2 is a diagram showing a transporting device and its determined route to a target on the grid.

FIG. 2 shows a transporting device located at an origin 201 on the grid and to traverse to a target 202. The target 202 is depicted with bottom left to top right hatching. As described previously, the route determination unit 101 is arranged to determine a route from the origin 201 to the target 202. As depicted in FIG. 2, the route determination unit 101 has determined a route 203. The route 203 is depicted with top left to bottom right hatching. When determining the route 203, the route determination unit 101 may take into account many factors, for example, shortest distance between the origin 201 and the target 202, movements of other transporting devices, number of direction changes required and constraint limits on particular constraint areas.

Although a route 203 is planned by the route determination unit 101, due to uncertainties in the exact position each transporting device and variations in acceleration, deceleration and constant velocities of each transporting device it is possible that each transporting device cannot merely follow its determined route 203 without risk of conflict between two transporting devices. To that end, the clearance unit 102 is arranged to clear only a portion of the determined route 203 thereby ensuring that a predetermined number of grid squares ahead of the transporting devices current motion is cleared of any other transporting device (based on the latest transporting device location information). In this way, the risk of transporting device collision is avoided.

The clearance is typically performed, for example, on a straight section of determined route 203 for the minimum number of cells of the grid required for the transporting device to come to a stop without collision risk. For example, if the transporting device is travelling at a speed which requires two grid cells to completely stop then the clearance unit 102 is arranged to clear two cells in front of the current transporting device such that, when required, the transporting device can come to a halt without collision risk. In another example, if the transporting device is travelling at a speed which requires 2.5 grid cells to come to a stop then the clearance unit 102 clears 3 grid cells in front of the transporting device to ensure that the transporting device can come to a stop entirely contained within one grid cell, thereby ensuring that a transporting device does not overlap with other grid cells once it has come to a stop.

Figure 3:
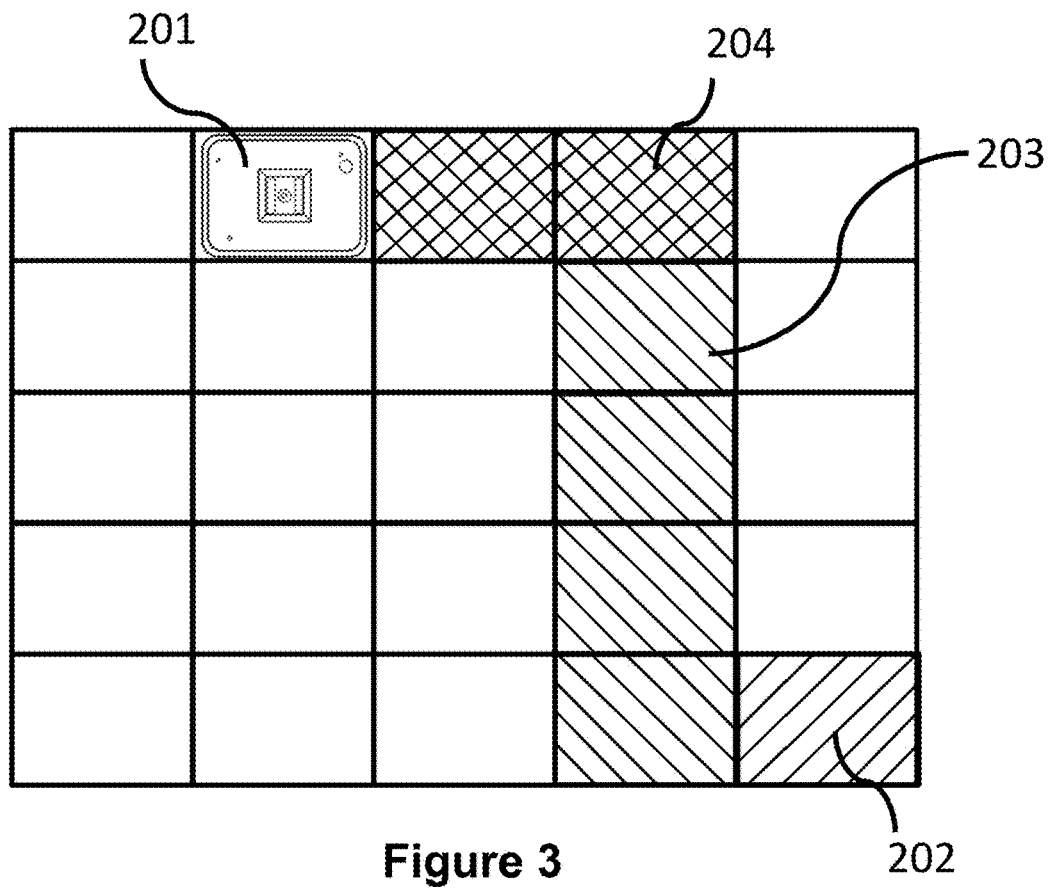
FIG. 3 is a diagram showing a transporting device, its determined route to a target and the cleared portions of the route along which the transporting device is permitted to travel.

Moreover, as shown in FIG. 3, where a direction change of the transporting device is required a predetermined distance in front of the transporting device, then the clearance unit 102 is arranged to clear the determined route 203 up until the corner where the direction change occurs. In the example shown in FIG. 3, the cleared portion 204 of the route 203 is shown with cross hatched lines.

Figure 4:
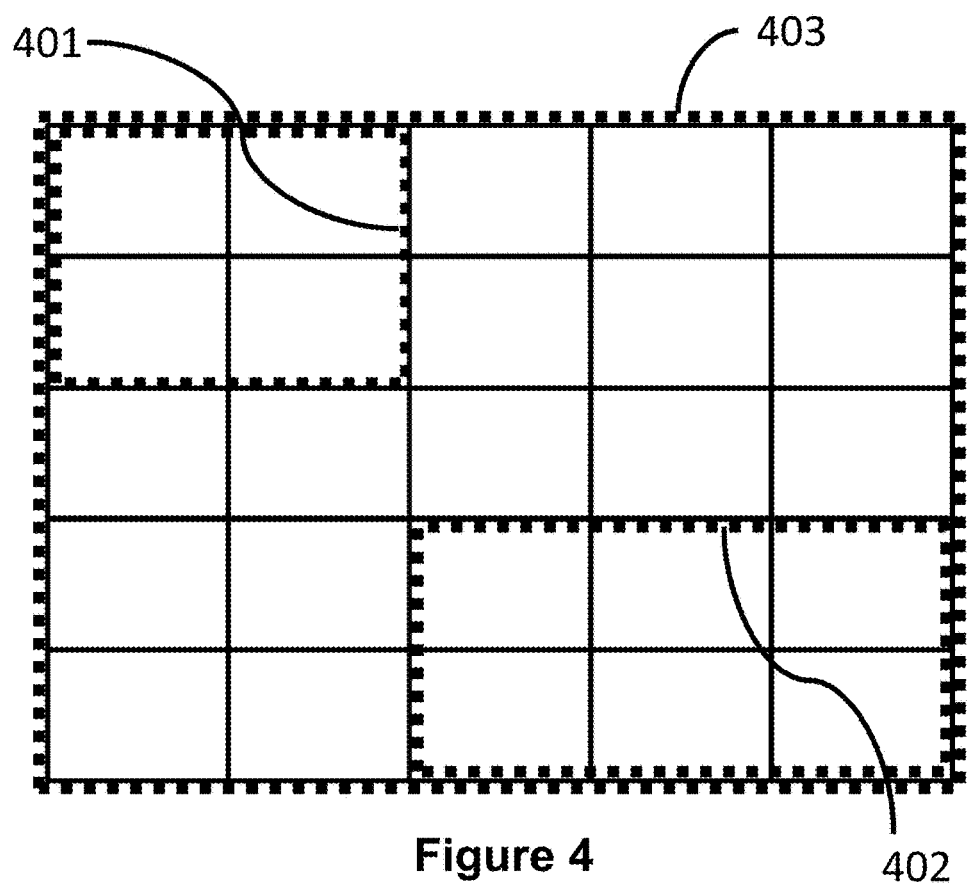
FIG. 4 is a diagram showing three constraint areas positioned on the grid.

FIG. 4 shows an example of a plurality of constraint areas as determined by the constraint area determination unit 103. In this example, a first constraint area 401 is formed of two grid cells in a first direction and two grid cells in a second direction. A second constraint area 402 is formed of three grid cells in a first direction and two grid cells in a second direction. As will be appreciated, the first and second constraint areas may be formed of any number of grid cells in a first direction and any number of grid cells in a second direction. In this example, the first and second constraint areas do not overlap. In one example, based on a structural analysis of the grid, the first constraint area 401 and the second constraint area 402 may be determined to have the shape and location assigned to them so as to limit, for example, shear force on the grid in their particular locations. Alternatively or additionally, the constraint areas may be determined based on a fatigue analysis of the grid. A third constraint area 401 is arranged to cover the entire grid and to thereby overlap with both the first and second constraint areas. In this way, a measure of the total shear force acting on the grid can be estimated and limited by ensuring transporting devices are not provided clearance to move or not planning routes in particular locations.

Similarly, the constraint areas may be instead/additionally be determined based on a structural analysis and/or a fatigue analysis of any mezzanines or peripherals associated with the grid. For example, the grid may have a number of levels providing services or support to the grid. Similarly, the grid may further comprise peripherals which, for example, allow transporting devices to retrieve containers from locations outside of the grid and/or deposit containers for locations outside of the grid. The peripherals may be arranged to remove/deposit containers from/onto the grid.

Figure 5:
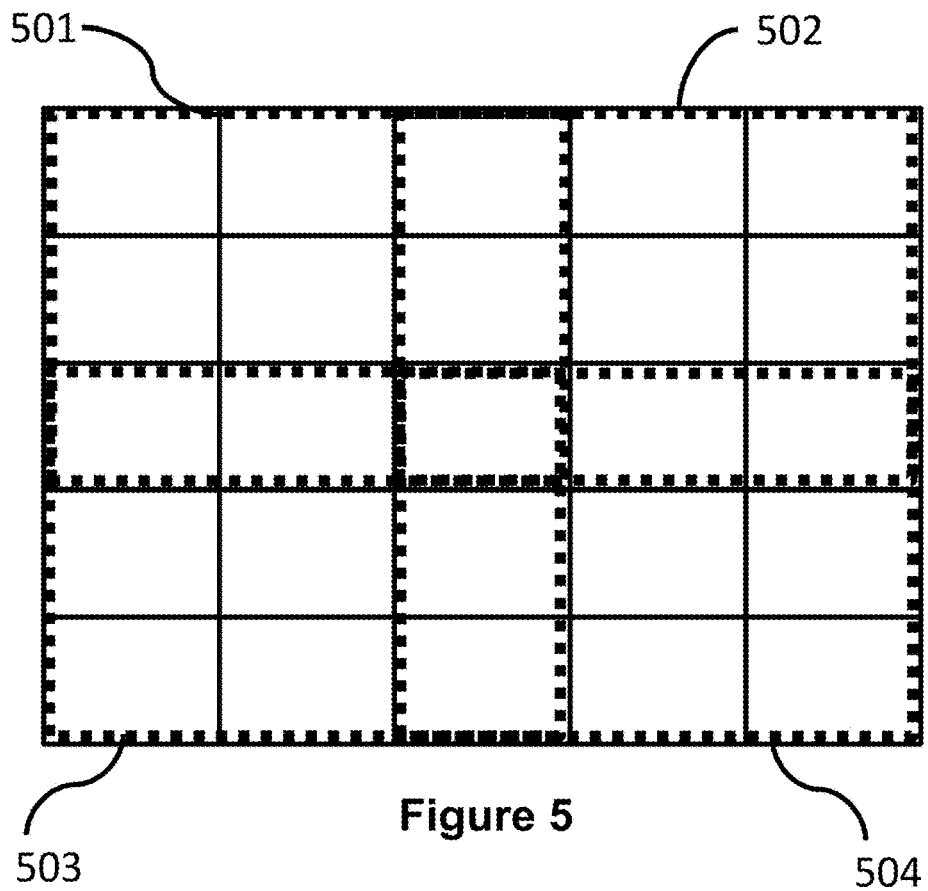
FIG. 5 is a diagram showing four overlapping constraint areas positioned on the grid.

FIG. 5 shows another example of constraint areas determined by the constraint area determination unit 103. In this example, four equally sized constraint areas are determined where each constraint area overlaps with at least one other constraint area. More specifically, a first constraint area 501 is determined as extending 3 grid cells in a first direction and 3 grid cells in a second direction. A second constraint area 502 overlaps with the first constraint area 501 and is similarly formed of 3 grid cells extending in a first direction and 3 grid cells extending in a second direction. A third constraint area 503 is the same size as the first constraint area 501 and the second constraint area 502 and overlaps with the first constraint area 501 and the second constraint area 502. A fourth constraint area 504 overlaps with each of the first constraint area 501, the second constraint area 502 and the third constraint area 503 and extends three grid cells in the first direction and three grid cells in the second direction. In this way, each constraint area overlaps with at least one other constraint area.

Figure 6:
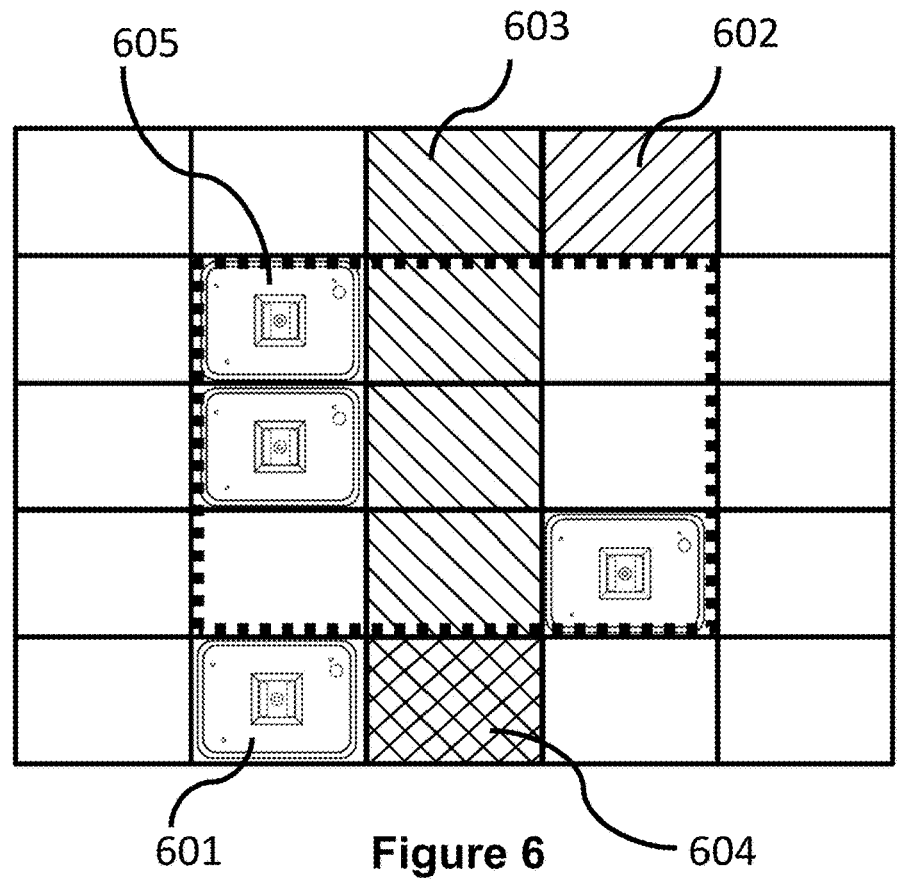
FIG. 6 is a diagram showing a transporting device with a route determined to traverse a constraint area through which the transporting device is permitted to traverse.

FIG. 6 shows a non-limiting example of a transporting device traversing the grid. In particular, FIG. 6 shows a transporting device at an origin 601 intending to travel to a target 602. As explained previously the route determination unit 101 determines a route 603 for the transporting device from the origin 601 to the target 602. In the example shown in FIG. 6, the determined route 603 traverses a constraint area comprising, in this example, three transporting devices 605. As will be appreciated, the three transporting devices are provided by way of example only and a constraint area may contain any or even no transporting devices. In this example, a predetermined threshold is set which limits the number of transporting devices in the constraint area to four. In other words, the constraint limit of the number of transporting devices in the example constraint area cannot exceed four. As will be appreciated, this predetermined threshold of four transporting devices is by way of example only and the predetermined threshold need not be limited to four or the number of transporting devices but other measures of activity in the constraint area, such as number of transporting devices moving/accelerating in a particular direction, number of transporting devices accelerating/decelerating in a particular direction, or any combination of the above factors.

FIG. 6 also shows the cleared portion 604 of the determined route 603. As explained previously, the clearance unit 102 is arranged to clear a portion of the determined route 603. In FIG. 6, the clearance unit 102 has cleared a portion up to a corner of the determined route which corresponds with a direction change for the transporting device. As shown in FIG. 6, once the transporting device reaches the cleared portion 604 the clearance unit 102 will grant clearance for the next portion of the determined route 603. For example, if the number of transporting devices does not exceed four then the clearance unit 102 will clear the portion of the determined route 603 traversing the constraint area.

Figure 7:
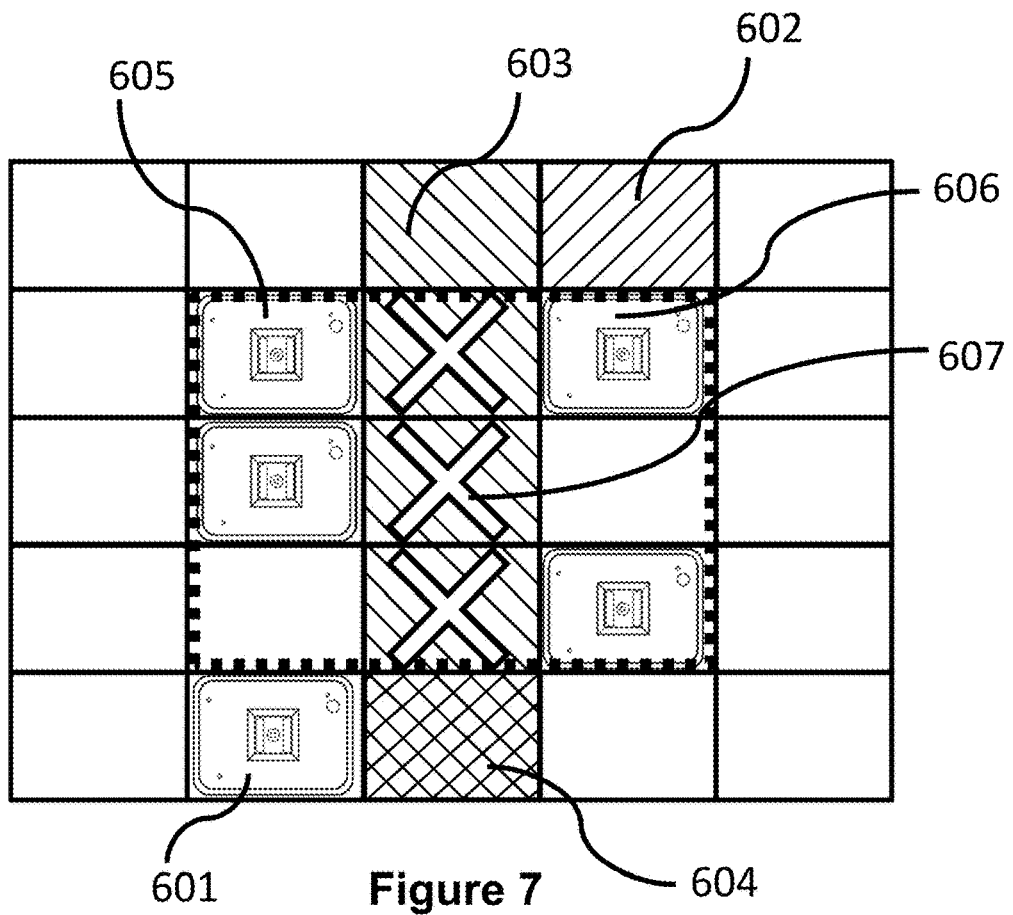
FIG. 7 is a diagram showing a transporting device being refused clearance to traverse a constraint area through which the transporting device is not permitted to traverse.

FIG. 7 shows a corresponding example to FIG. 6, however, an additional transporting device 606 is present in the constraint area and therefore the number of transporting devices presently in the constraint area equals four. In this non-limiting example, because the constraint limit of the number of transporting devices in the constraint area is equal to a predetermined threshold of four transporting devices, the clearance unit 102 is further arranged to withhold clearance for a transporting device to traverse the constraint area. Accordingly, as shown in FIG. 7 the clearance unit will withhold clearance for the transporting device to traverse the constraint area. "X" 607 is shown in FIG. 7 depicts portions of the determined route 603 for which the clearance unit 102 has withheld clearance for the transporting device.

Accordingly, the transporting device will be prevented from entering the constraint area and, in this example, will also be cleared up to the edge of the constraint area. However, as will be appreciated, clearance may be withheld any number of grid cells before the transporting device reaches the constraint area. For example, clearance may be withheld before the transporting device reaches the edge of the constraint area.

Optionally, a number of actions may be performed when the clearance unit 102 withholds clearance for the transporting device to traverse the constraint area. In particular, once clearance for a transporting device is withheld, there is no cleared route for the transporting device to move in and therefore one option would be for the transporting device to merely stop moving. However, this causes a hazard on the grid for other transporting devices which must be navigated around. Moreover, the function being performed by the transporting device still needs to be fulfilled. Therefore, the present inventors have realised a number of advantageous solutions to control the movement of the transporting device once clearance is withheld.

For example, the route determination unit 101 may be arranged to re-determine a route for the transporting device to traverse the grid. The route re-determination being performed at a new time may result in a similar route being re-determined, perhaps even traversing the same constraint area because the constraint limit may have fallen below the predetermined threshold. Alternatively, a route may be re-determined so as to avoid the constraint area for which clearance was withheld. Alternatively, or in addition, the route determination means 101 may be arranged to re-determine the routes of at least two of the plurality of transporting devices. Similar to the explanation above, by re-determining routes for at least two of the plurality of transporting devices, transporting devices can be designated on routes which avoid one another.

Alternatively or additionally, the controller 100 may be arranged to perform a controlled stop of the transporting device for which clearance was withheld. In this regard, a controlled stop of a transporting device is defined as bringing the transporting device to a stop in the first complete grid cell for which the transporting device can stop without collision risk—in other words, not bringing the transporting device to a stop half in one grid cell and half in another grid cell. For example, if the transporting device is able to stop in two grid cells from a particular speed, then a controlled stop of the transporting device would be commanded for the transporting device to stop in two grid cells so that it is fully contained within one grid cell—not protruding into any other grid cell. On the other hand, if the transporting device would require 2.5 grid cells to stop without collision risk from a particular speed then the transporting device will be commanded to stop in 3 grid cells—rounding up the number of grid cells. In this way, the transporting device stops in a complete grid cell without protruding into any other grid cell. Alternatively or additionally, the controller 101 may be arranged to command a controlled stop for a least two of the plurality of transporting devices. In this way, a number of transporting devices are brought to a stop without collision risk when a transporting device is withheld clearance for a constraint area.

Figure 8:
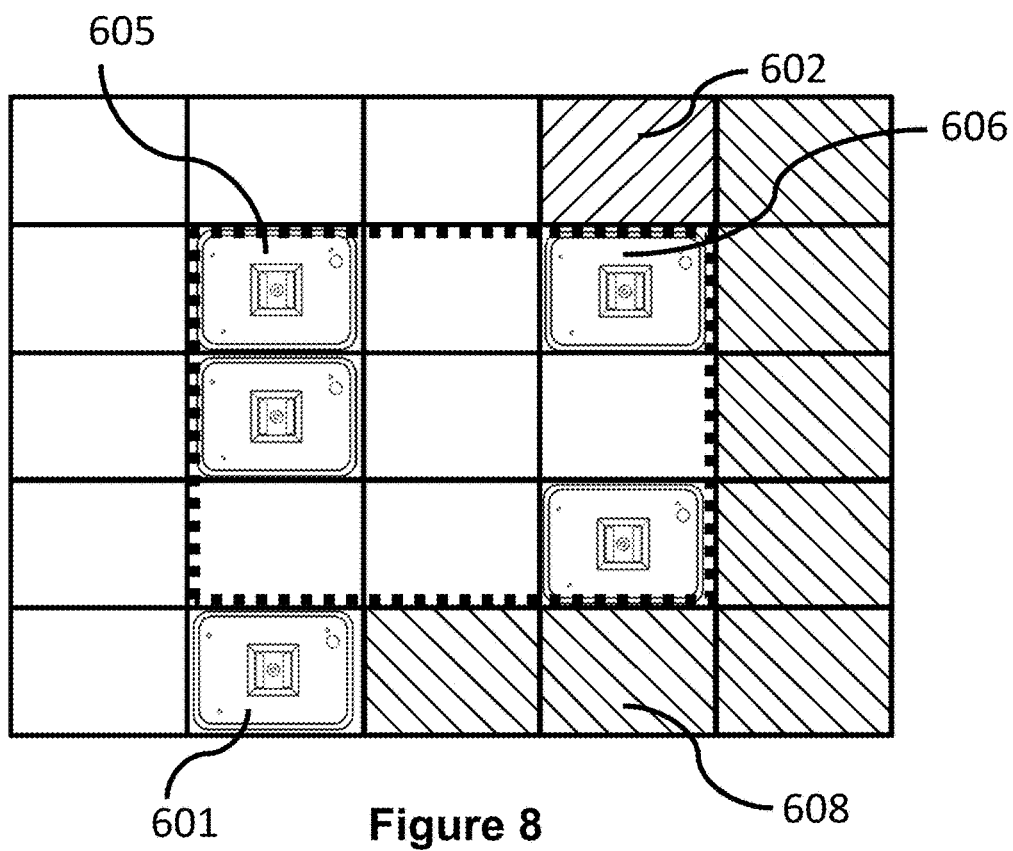
FIG. 8 is a diagram showing a determined route around a constraint area through which the transporting device is not permitted to traverse.

FIG. 8 shows another example, which may or may not be combined with the actions shown in FIG. 7. In particular, in FIG. 8, the constraint limit of four transporting devices in the constraint area exceeds the predetermined threshold. Accordingly the transporting device at the origin 601 is unable to traverse the constraint area. As described in FIG. 7, this is achieved by withholding clearance for the transporting device to enter the constraint area. However, in FIG. 8, the route determination means 101 is arranged to determine a route 608 for the transporting device from the origin 601 to the target 602 not traversing the constraint area. In this way, the transporting device is successfully directed onto the route 608 avoiding the constraint area.

The present inventors envisage, that either or both of the actions described in FIGS. 7 and 8 could be implemented. In other words, when the constraint limit of a particular constraint area is greater than or equal to a predetermined threshold the route determination unit 101 may determine a route 608 not traversing the constraint area, alternatively or additionally, the clearance unit 102 may be arranged to withhold clearance for the transporting device to traverse the constraint area.

Figure 9:
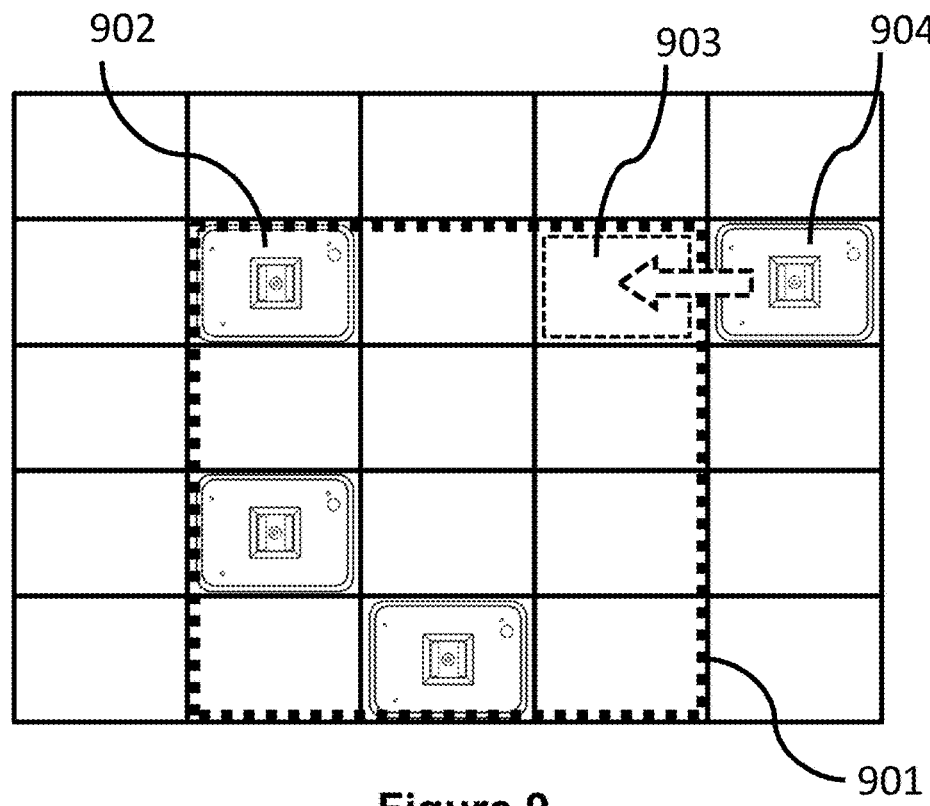
FIG. 9 is a diagram showing a constraint area comprising three transporting and a fourth transporting device preparing to move into the constraint area.
Figure 10:
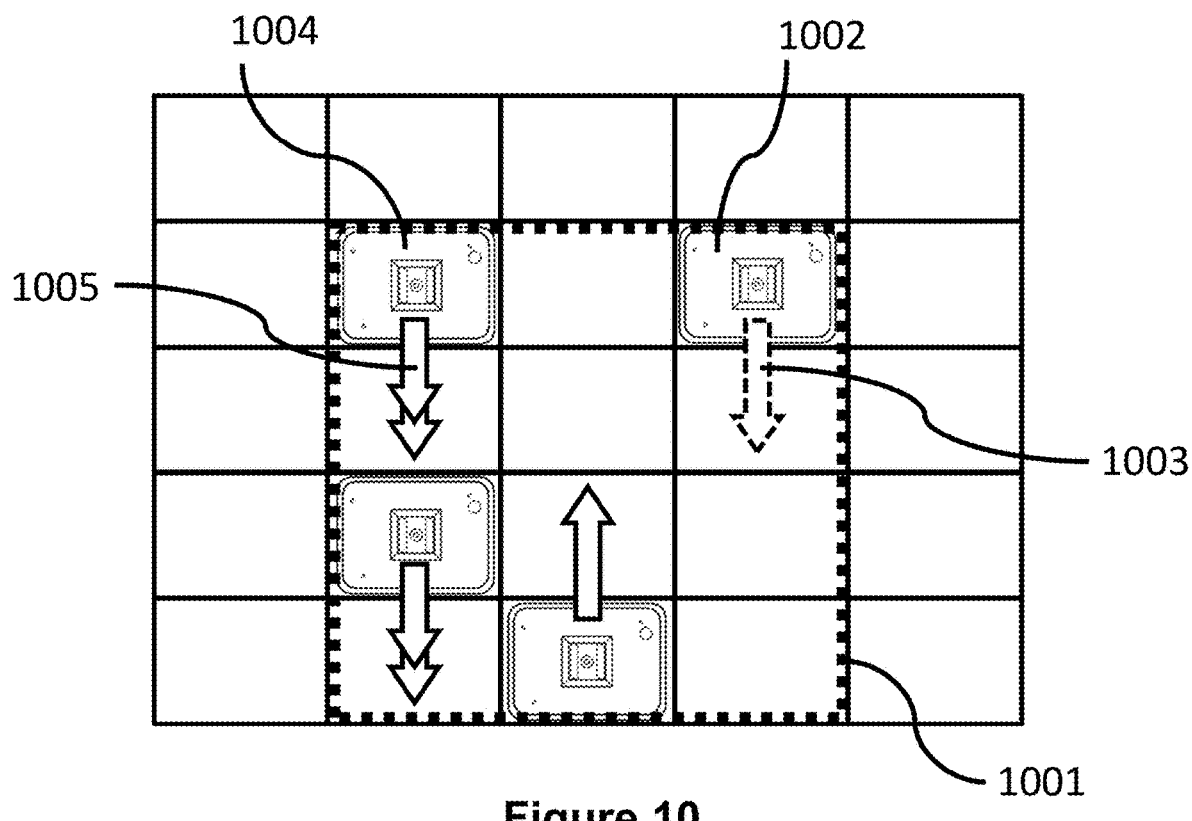
FIG. 10 is a diagram showing a constraint area comprising three transporting devices moving and/or accelerating in a first direction and a fourth transporting device preparing to move and/or accelerate in a first direction.
Figure 11:
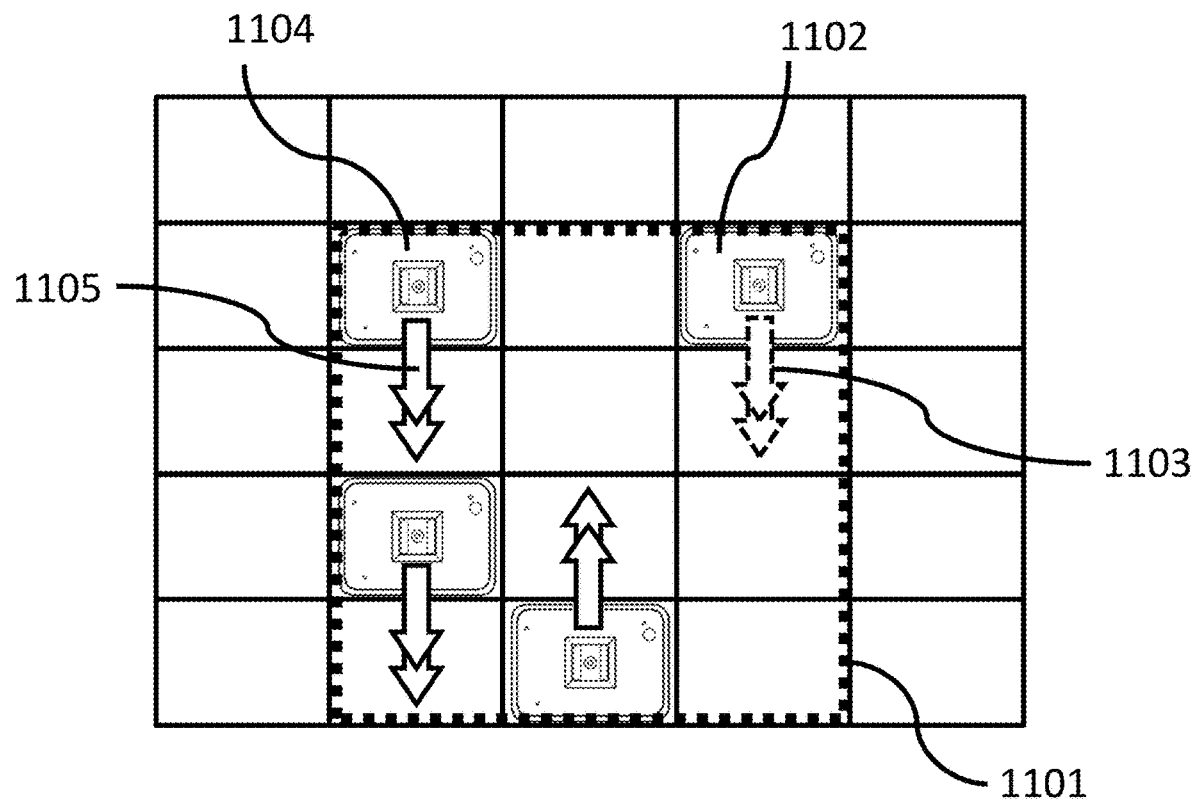
FIG. 11 is a diagram showing a constraint area comprising three transporting device accelerating in a first direction and a fourth transporting device preparing to accelerate in a first direction.

FIGS. 9 to 11 show different ways of measuring constraint limits, at least one of which is calculated by the calculation unit 104 for a particular constraint area.

More specifically, FIG. 9 relates to a constraint limit indicative of the number of transporting devices 902 in the constraint area. For example, FIG. 9 shows the constraint area comprising three transporting devices 902. In this example, the predetermined threshold is set as four transporting devices. Accordingly, when the number of transporting devices in the constraint area equals four then no further transporting devices are permitted to enter the constraint area, however, transporting devices already in the constraint area may leave the constraint area or move to other locations within the constraint area. Accordingly, in FIG. 9, only one more transporting device is permitted to enter the constraint area because the constraint area already comprises three transporting devices. Therefore, empty grid cell 903 may be filled by transporting device 904, after which, any other transporting devices determined to enter the constraint area will have their clearance withheld and/or have their route re-determined.

FIG. 10 shows another constraint limit calculated as the number of transporting devices 1004 moving and/or accelerating in a particular direction in a constraint area. In FIGS. 10 and 11, transporting devices are shown moving at a constant speed with a single headed arrow whereas transporting devices are shown accelerating/decelerating with a double headed arrow. Moreover, in FIGS. 10 and 11, the transporting devices are shown moving and/or accelerating in a first direction. Therefore, the constraint limit pertains to the first direction. However, as will be appreciated, the constraint limit and motion of the transporting devices may be equally applied to the second direction.

For the sake of understanding, movements/accelerations down the page are defined as negative movements/accelerations whereas movements/acceleration up the page are defined as positive movements/accelerations. In FIG. 10, the constraint area comprises four transporting devices. Initially, three of the transporting devices 1004 are moving and/or accelerating in a first direction. In particular, the two leftmost transporting devices are accelerating 1005 negatively. The middle transporting device is moving at constant velocity positively. Transporting device 1002 is stationary. In this example, the constraint limit is defined based on the number of transporting devices moving and/or accelerating in a first direction, in either the positive or negative direction. However, the constraint limit could be defined as the number of transporting devices moving and/or accelerating in a second direction.

Based on FIG. 10, three transporting devices are moving and/or accelerating in a first direction. More specifically, two transporting devices are accelerating in a negative direction and one transporting device is moving in a positive direction totalling three transporting devices. In this example, the predetermined threshold may be defined as four transporting devices moving in a first direction. Therefore, when four transporting devices are moving/accelerating within the constraint area then further transporting devices will have their clearance withheld and/or routes determined to avoid the constraint area. For example, the fourth transporting device 1002, which was previously stationary, may begin to move (as depicted by arrow 1003) in a negative direction within the constraint area. Therefore, the predetermined threshold of four transporting devices moving/accelerating in a first direction is reached. Accordingly, a fifth transporting device (not shown) will have clearance withheld and/or route determined to avoid the constraint area. However, transporting devices already moving/accelerating in the constraint area may continue to move/accelerate in the constraint area and leave the constraint area.

As will be appreciated, although the previous description concerned moving/accelerating transporting devices in a first direction, the present inventors envisage that the constraint limit may alternatively/additionally be the number of transporting devices moving/accelerating in the second direction.

FIG. 11 shows a further non-limiting example of the determination of a constraint limit. The constraint limit is calculated based on the expected force exerted on a particular constraint area from the transporting devices accelerating/decelerating. More specifically, in FIG. 11, the expected force is calculated based on the transporting devices in the constraint area 1101 accelerating/decelerating in the first direction. For example, three transporting devices 1104 are shown accelerating/decelerating in the constraint area 1101. A fourth transporting device 1102 is shown stationary. The transporting devices 1104 are shown to be accelerating/decelerating by way of double-headed arrows 1105. For the sake of a clear description, accelerations down the page are defined as negative accelerations and accelerations up the page are defined as positive accelerations. Therefore, with reference to FIG. 11 the two leftmost transporting devices are accelerating in a negative direction whereas the middle transporting device is accelerating in a positive direction.

The constraint limit of the expected force on the constraint area is calculated based on the overall acceleration of the transporting devices. In particular, in this simplified example, because two of the transporting devices are accelerating in opposite directions the calculating unit 104 is arranged to cancel out the effective accelerations of the transporting devices accelerating in opposite directions. Therefore, in the simplified example of FIG. 11 the force exerted on the constraint area is dependent on only the negative acceleration of one transporting device because the force of two other transporting devices may cancel out. A predetermined threshold indicative of the force exerted on a constraint area may be set as two transporting devices accelerating/decelerating. Therefore, because the force exerted on the constraint area is only based on one transporting device, another transporting device may be granted clearance to traverse the constraint area and/or the route determination unit 101 may determine routes which traverse the constraint area.

In a further example, the transporting device 1102 may accelerate in a negative direction 1103. Therefore, the calculating unit 104 may calculate that the force exerted on the constraint area 1101 is now based on two transporting devices accelerating because, as explained previously, the force of accelerations from two transporting devices accelerating in opposite directions may cancel out. Therefore, if the predetermined threshold is set such that the force exerted on the constraint area 1101 is equal to two transporting devices accelerating then this further example is equal to the predetermined threshold. Therefore, in this example, a fifth transporting device (not shown) would have its clearance withheld to enter the constraint area and/or have a route determined so as not to traverse the constraint area 1101. However, transporting devices already in the constraint area may continue to accelerate and leave the constraint area. In this way, the force exerted on the constraint area 1101 is restrained so as not to exceed a structural and/or fatigue load limit.

A simplified example has been described above, in which each transporting device accelerates precisely like every other transporting device thereby allowing two transporting devices accelerating in opposite directions to exactly cancel out. However, in reality, a number of factors may be taken into account to determine the overall force on the constraint area 1101 and to determine whether it equals or is greater than a predetermined threshold. More specifically, the force calculated by the calculation unit 104 may be calculated based on at least one of a direction of motion of each transporting device, a mass of a transporting device, a mass of a payload carried by a transporting device, an expected acceleration profile of a transporting device, an expected deceleration profile of a transporting device, a possibility of the plurality of transporting devices on the grid being commanded to stop at the same time, a possibility of any one of the plurality of transporting devices on the grid being commanded to stop at any arbitrary time.

As will be appreciated, although the previous description concerned accelerating/decelerating transporting devices in a first direction, the present inventors envisage that the constraint limit may alternatively/additionally be the number of transporting devices accelerating/decelerating in the second direction.

Figure 12:
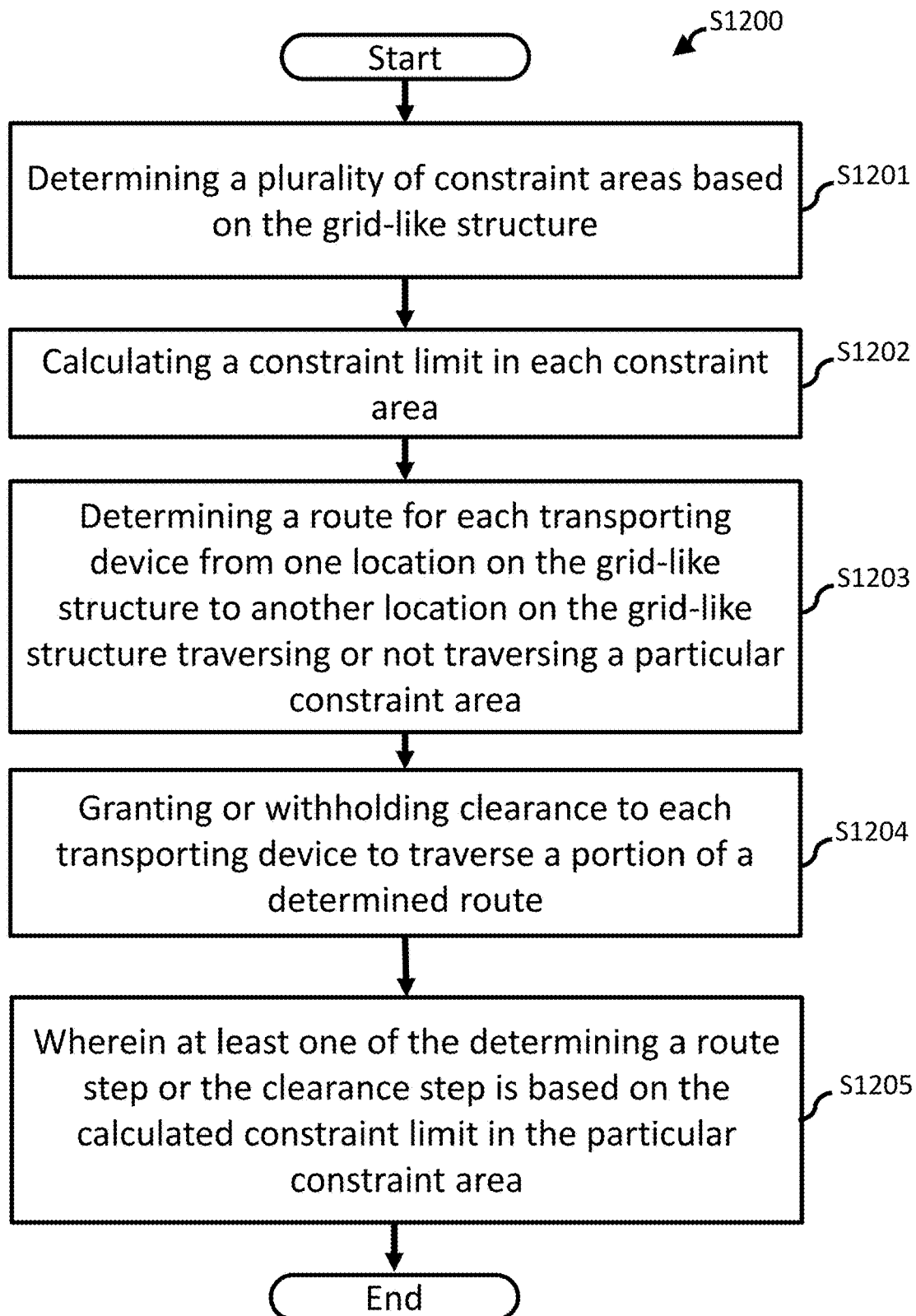
FIG. 12 is a flowchart of method steps performed by the controller according to the first embodiment.

FIG. 12 shows the processes performed by the controller 100 according to the first embodiment as shown in FIG. 1. In particular, the flowchart 51200 of FIG. 12 shows the controlling of at least one transporting device based on a calculated constraint limit in a determined constraint area.

Step S1201 determines a plurality of constraint areas based on the grid. The constraint areas pertain to areas of the grid in which the method 51200 is to control the number of transporting devices and/or how they move. In this way, the method 51200 can limit the structural loading and/or fatigue loading on the grid in particular areas. For example, the placement of constraint areas may be determined based on a structural analysis and/or fatigue analysis of at least one of the grid, mezzanines associated with the grid or any peripherals associated with the grid. Based on the analysis it may be determined to place a constraint area across the entire grid. In this way, the static load, dynamic load and/or shear load of the entire grid can be controlled. In other examples, the constraint areas may be formed of a predetermined number of cells in the first direction and a predetermined number of cells in the second direction. Moreover, each constraint area may be determined to overlap with at least one other constraint area.

Step S1202 calculates a constraint limit in each determined constraint area. For example, the constraint limit may be calculated based on the number of transporting devices in a constraint area, the number of transporting device moving and/or accelerating in a first/second direction in a constraint area or based on an expected force resulting from the number of transporting devices accelerating in a first/second direction.

In more detail, the constraint limit may be the absolute number of transporting devices in a particular constraint area. Additionally or alternatively, the constraint limit may be the absolute number of transporting devices moving/accelerating in a constraint area in a first/second direction. Additionally or alternatively, the constraint limit may be the expected force acting on the constraint area caused by the number of transporting devices accelerating in a first/second direction. With regard to calculating the expected force, step S1202 takes into account the respective accelerations of each transporting device to calculate the expected force. For example, if two transporting devices are accelerating in opposite directions with the same magnitude and mass then the force exerted on the constraint area of the grid by each transporting device may exactly cancel out and therefore the step S1202 may take this into account when calculating the expected force.

Moreover, step S1202 when calculating an expected force may take into account at least one of a direction of motion of each transporting device, a mass of a transporting device, a mass of a payload carried by a transporting device, an expected acceleration profile of a transporting device, an expected deceleration profile of a transporting device, a possibility of the plurality of transporting devices on the grid being commanded to stop at the same time, a possibility of any one of the plurality of transporting devices on the grid being commanded to stop at any arbitrary time.

At step S1203, the controller determines a route for each transporting device from one location on the grid to another location on the grid traversing or not traversing a particular constraint area. More specifically, the transporting device intending to traverse the grid from one location to another needs to have a route determined for its traversal so as to avoid other transporting devices. Accordingly, the step S1203 determines the route based on, for example, current location information of transporting devices and future information about predicted locations of transporting devices based on the routes they intend to follow. Moreover, other information may be used in the determination of the route, for example, battery charge level, service level, acceleration/deceleration profile, maximum speed or shortest distance between the locations on the grid. As will be described with regard to Step S1205, the route may be determined based on the calculated constraint limit in the particular constraint area.

Step S1204 grants or withholds clearance for each transporting device to traverse a portion of the determined route. Although each transporting device has its route determined by the step S1203 small errors in the exact position of each transporting device will compound as the route is traversed. For example, differing acceleration profiles and/or speeds of each transporting device compared to the expected value result in an error in the position of each transporting device. Therefore, the compounded error for the position of each transporting device must be accounted for. Step S1204 grants or withholds clearance for each transporting device to traverse a portion of the determined route, in this way, step S1204 ensures that each transporting device only moves into grid cells which are known not to contain another transporting device so as to avoid conflict between transporting devices.

In a preferred embodiment, the present inventors have found a preferred manner to mostly account for the compounded error, although step S1204 is needed to grant/withhold clearance for a transporting device to transverse a portion of the determined route. In particular, a transporting device moving from an origin to a target on the grid accomplishes this movement with one or more legs. In other words, the determined route is broken up into one or more legs. Each leg is a traversal in either constant first direction (for example, in a constant X-direction) or a constant second direction (for example, a constant Y-direction). The method 51200 is arranged to allow sufficient tolerance on each leg to allow for the non-erroneous statistical variation in transporting device performance over the transporting device population; in terms of first/second direction translation;

wheel change; and internal clock variation; as wheel as potential transmission delays of transporting device commands to the transporting devices and status messages from the transporting devices. Thereby the determined route provides sufficient time tolerance to allow (non-erroneous) transporting devices arriving late at the end of one leg to start the next leg at the planned time. For transporting device arriving at the end of a leg early; the transporting device simply waits until the nominal start time of the following leg; before starting that leg.

The number of grid cells to clear for each transporting device may depend on the speed of the transporting device as well as expected acceleration/deceleration profiles. In particular, the number of grid cells cleared may depend on the number of grid cells the transporting device takes to stop from its current speed. For example, if the transporting device is known (based, for example, on its deceleration profile) to take 2.5 grid cells to stop based on its current speed then step S1204 may clear 3 grid cells to ensure the transporting device, if necessary, can come to a stop completely in 3 grid cells distance. In this way, the transporting device also comes to a complete stop inside one grid cell without protruding into other grid cells which would be a hazard to other transporting devices. In another example, where a direction change operation is required of the transporting device in 2 grid cells then the step S1204 may only clear those 2 grid cells so as to clear the transporting device up to the direction change. As will be described with regard to Step S1205, clearance may be granted or withheld based on the calculated constraint limit in the particular constraint area.

At step 1205, at least one of step S1203 and/or step S1204 perform their respective action based on the calculated constraint limit in the particular constraint area. More specifically, clearance is granted or withheld for a transporting device based on the calculated constraint limit and/or a route traversing or not traversing a constraint area is determined based on the calculated constraint limit.

With regard to the granting or withholding clearance step, clearance is granted or withheld to a transporting device to traverse a portion of the determined route in a particular constraint area based on the calculated constraint limit. In one example, when the constraint limit in a particular constraint area is greater than or equal to a predetermined threshold then step S1204 withholds clearance to the transporting device. When the constraint limit is less than the predetermined threshold then step S1204 grants clearance to the transporting device. In this way, constraint areas are not overloaded with regard to static, dynamic and/or shear loading.

Moreover, when clearance is withheld a number of actions may be performed to move the transporting device from its last cleared grid cell. In particular, step S1203 may determine the route of the transporting device from the last cleared grid cell. In this way, step S1203 may determine a route to avoid the constraint area for which the transporting device was not cleared to traverse. Similarly, the step S1203 may determine routes for at least two of the plurality of transporting devices. In this way, routes of transporting devices which may conflict are determined so as to avoid one another. Alternatively, a controlled stop of the transporting device may be performed to bring to a halt the transporting device without collision risk completely within a single grid cell, for example, bringing the transporting device to a halt in the last cleared grid cell. Similarly, a controlled stop of at least two of the plurality of transporting devices may be performed so ensure no two transporting devices end up in conflict with one another.

Additionally, or alternatively, to granting/withholding clearance, step S1203 of determining a route for the transporting device may occur when the constraint limit in a particular constraint area is greater than or equal to a predetermined threshold. In this case, step S1203 may determine a route for a transporting device from one location to another location not traversing a particular constraint area. Alternatively, when the constraint limit is less than the predetermined threshold, step S1203 may determine a route traversing the particular constraint area or allow the transporting device to continue along the route already determined. In this way, routes can be determined to avoid particular constraint areas.

Modifications and Variations

Many modifications and variations can be made to the embodiments described above, without departing from the scope of the present invention.

In particular, the transporting devices may be arranged to communicate with the controller 100 by way of a status report so as to provide information regarding, for example, their position, battery charge level, service issues, current direction of motion, whether they are stationary, moving at constant velocity or acceleration/decelerating. Accordingly, in one modification, when the calculation unit is calculating a constraint limit for a particular constraint area based on the number of transporting devices in the constraint area it may utilise the status report from each transporting device to determine, for example, the number of transporting devices in a particular constraint area. In this way, the controller 100 may utilise a message already being transmitted by the transporting device to the controller 100 to determine the number of transporting devices in a constraint area. Therefore, no additional messages need be communicated with the controller 100.

In a further modification, the controller 100 may further comprise a movement control unit arranged to control movement of the plurality of transporting devices. In this modification, the controller 100 directly controls how each transporting device moves rather than more general commands of which route to take across the grid and whether the transporting device is cleared to traverse a particular constraint area. In this modification, the controller 100 may make further commands to each transporting device whether to move in a particular direction, whether to accelerate/decelerate, whether to continue moving at a constant velocity. In this way, the controller 100 exerts direct control over each transporting device which may be useful because the controller 100 has information of all of the transporting devices and therefore may need to issue direct commands to the motors and mechanisms of a transporting device to avoid another transporting device or otherwise route the transporting device in a manner that control by each transporting device would be unable to achieve.

In another modification, the controller 100 may be designed and certified to prevent loads and/or fatigue which would result in a risk to human safety. Safety-rated equipment ensures that humans working around machinery are not harmed by the machinery due to either normal operation or fault. Typically, human rating equipment requires further and more rigorous testing than for non-safety-rated equipment. Moreover, alternative computer architectures are typically employed. In the alternative computer architectures typically two separate processes performing the same task operating. In some examples, the processes are each run on different CPUs. Each process will be programmed in a different way so that the same fault does not exist in both processes. A comparator is provided at the outputs of the processes which compares the outputs. If the outputs agree then the result is utilised to control the transporting devices. However, if the outputs disagree then, in one non-limiting example, a controlled stop of the transporting devices will be automatically commanded and a fault declared. In another non-limiting example, if the outputs disagree then the performance of the transporting devices may be degraded, for example by operating at a lower speed. Degradation of the performance of the transporting devices will typically be maintained until the fault is resolved.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfillment system in which stacks of bins or containers are arranged within a framework structure. The bins or containers are accessed by load handling devices operative on tracks located on the top of the frame structure. The load handling devices lift bins or containers out from the stacks, multiple load handling devices co-operating to access bins or containers located in the lowest positions of the stack. A system of this type is illustrated schematically in FIGS. 13 to 16 of the accompanying drawings.

Figure 13:
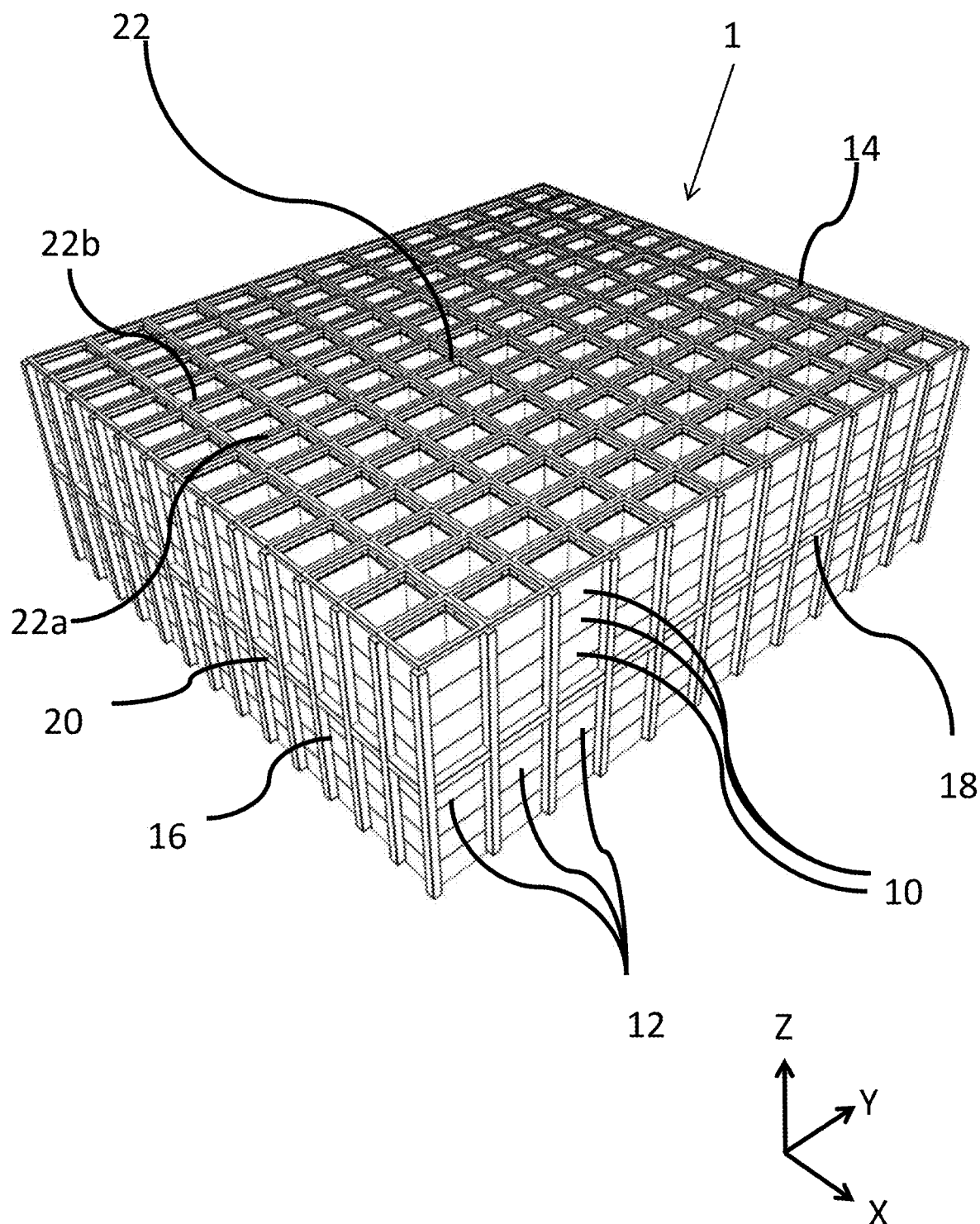
FIG. 13 is a schematic perspective view of a frame structure for housing a plurality of stacks of bins in a known storage system.
Figure 14:
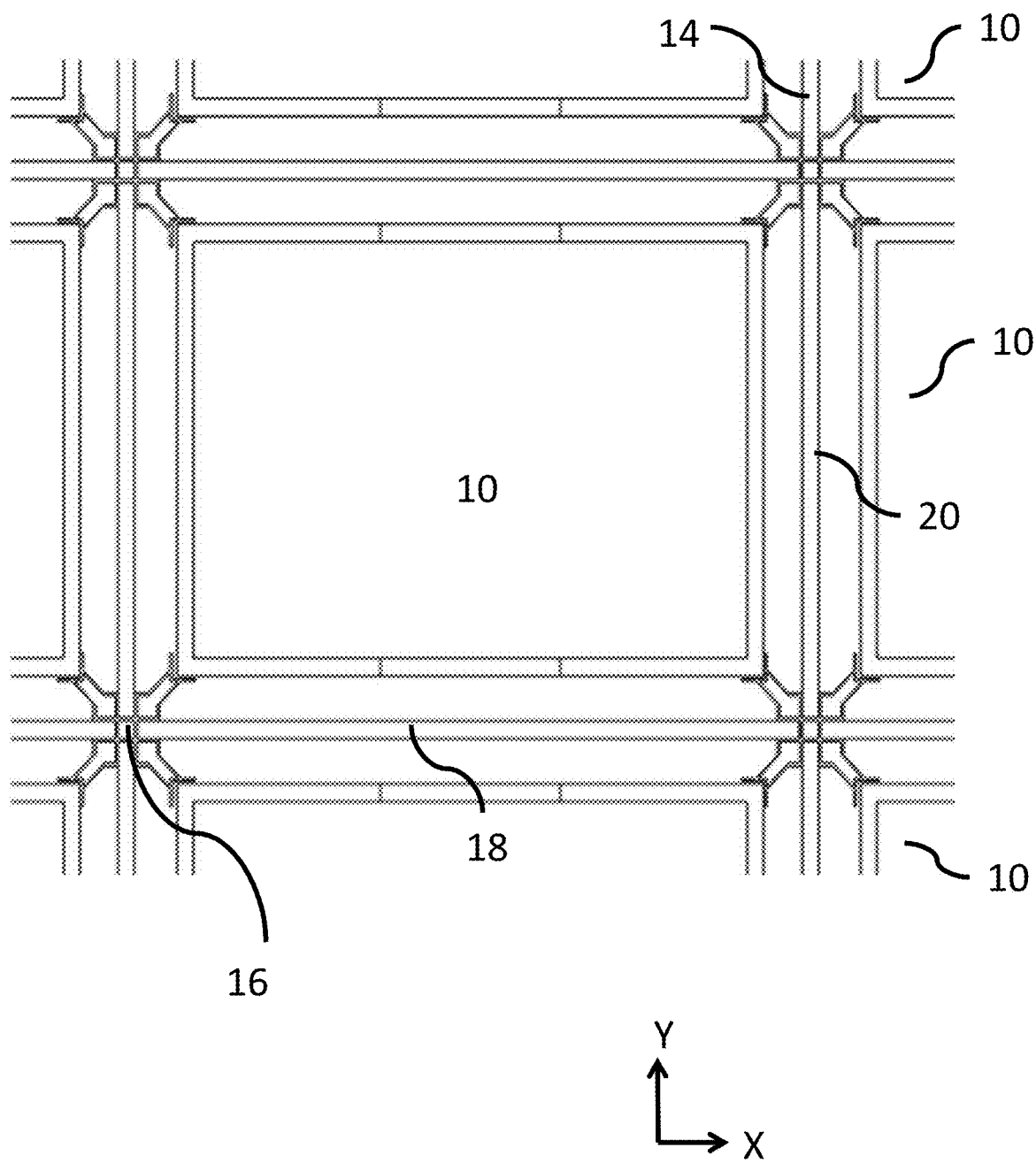
FIG. 14 is a schematic plan view of part of the framework structure of FIG. 13.

As shown in FIGS. 13 and 14, stackable containers, known as bins 10, are stacked on top of one another to form stacks 12. The stacks 12 are arranged in a grid framework structure 14 in a warehousing or manufacturing environment. FIG. 13 is a schematic perspective view of the framework structure 14, and FIG. 14 is a top-down view showing a stack 12 of bins 10 arranged within the framework structure 14. Each bin 10 typically holds a plurality of product items (not shown), and the product items within a bin 10 may be identical, or may be of different product types depending on the application.

The framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework structure 14, so that the framework structure 14 guards against horizontal movement of the stacks 12 of bins 10, and guides vertical movement of the bins 10.

Figure 15A:
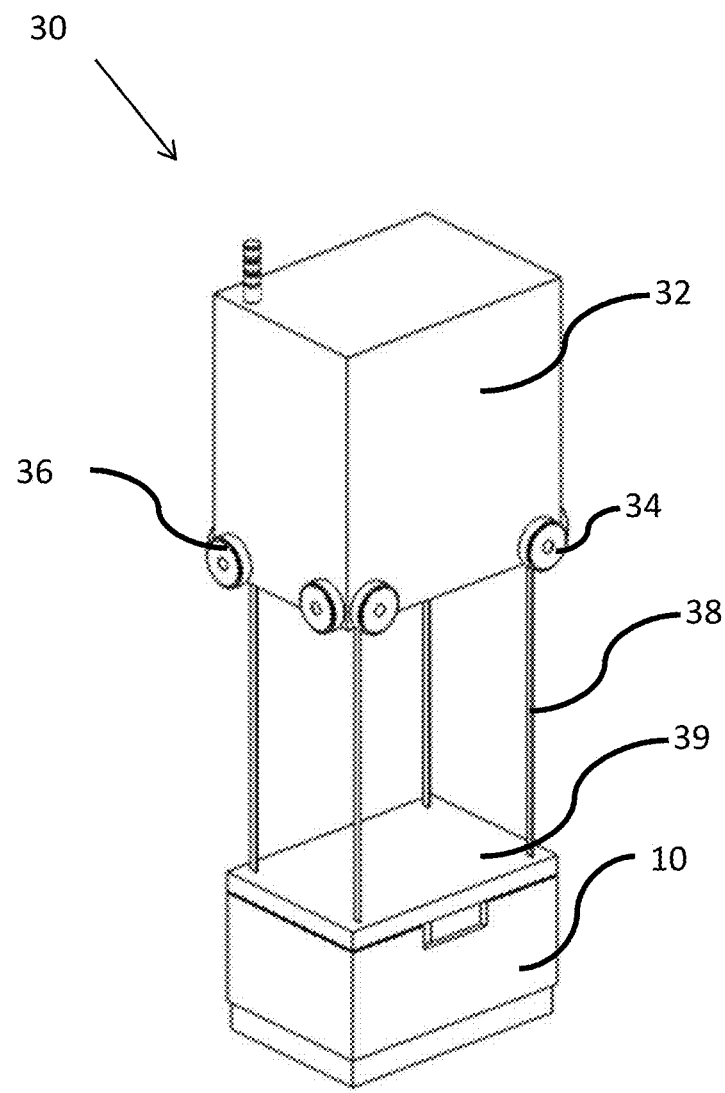
FIGS. 15(a) and 15(b) are schematic perspective views, from the rear and front respectively, of one form of load handler device for use with the frame structure of FIGS. 13 and 14.
Figures 15B, 15C:
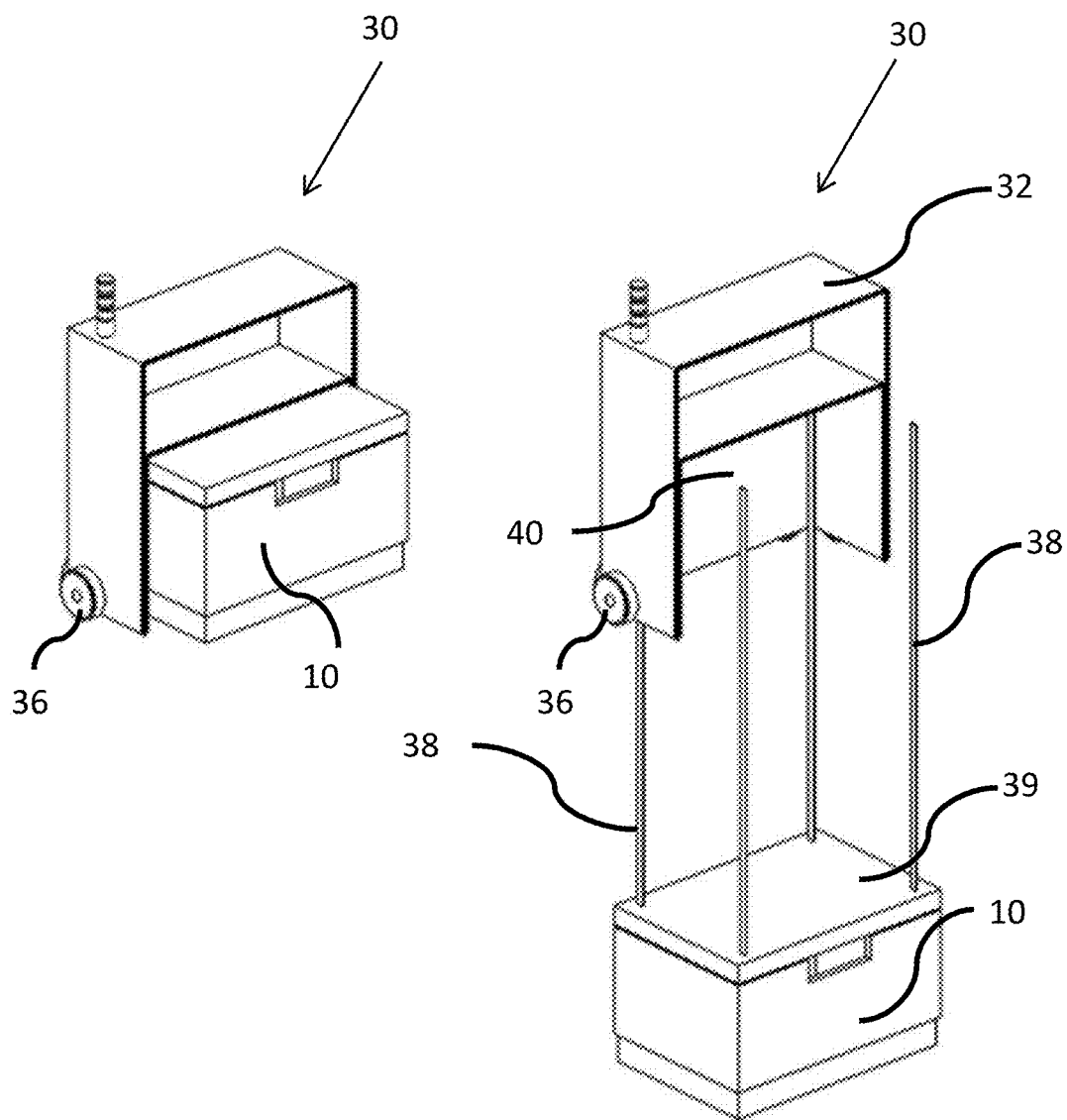
FIG. 15(c) is a schematic perspective view of the known load handler device in use lifting a bin.
Figure 16:
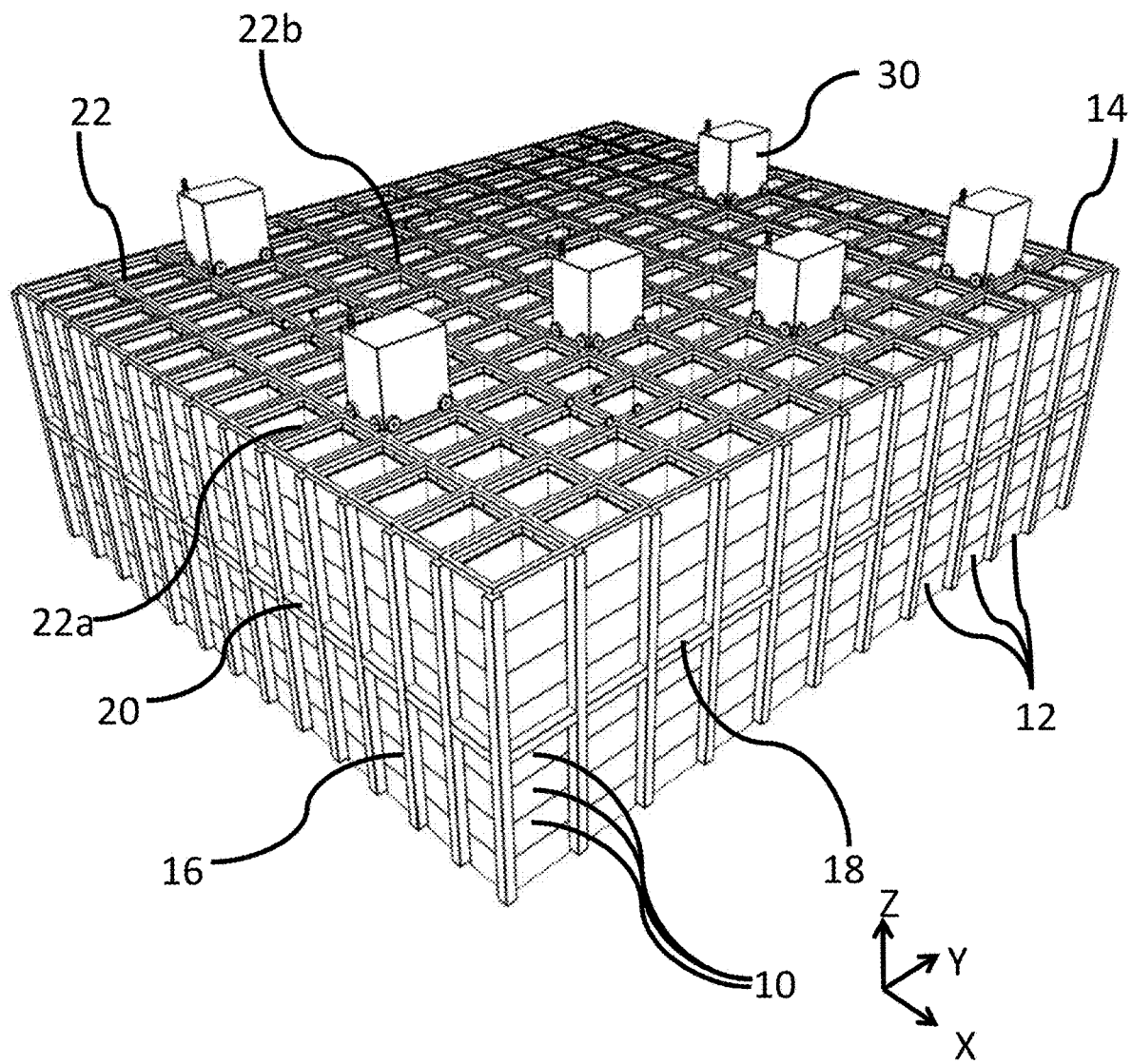
FIG. 16 is a schematic perspective view of a known storage system comprising a plurality of load handler devices of the type shown in FIGS. 15(a), 15(b) and 15(c), installed on the frame structure of FIGS. 13 and 14, the storage system comprising a plurality of drop off points or output ports.

The top level of the frame structure 14 includes rails 22 arranged in a grid pattern across the top of the stacks 12. Referring additionally to FIGS. 15 and 16, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

One form of load handling device 30 is further described in Norwegian patent number 317366, the contents of which are incorporated herein by reference. FIGS. 15(a) and 3(b) are schematic perspective views of a load handling device 30 from the rear and front, respectively, and FIG. 15(c) is a schematic front perspective view of a load handling device 30 lifting a bin 10. However, there are other forms of load handling device that may be used in combination with the system herein described. For example a further form of robotic load handling device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device. The lifting device 40 comprises a gripper plate 39 is suspended from the body of the load handling device 32 by four cables 38. The cables 38 are connected to a winding mechanism (not shown) housed within the vehicle 32. The cables 38 can be spooled in or out from the load handling device 32, so that the position of the gripper plate 39 with respect to the vehicle 32 can be adjusted in the Z direction.

The gripper plate 39 is adapted to engage with the top of a bin 10. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is powered and controlled by signals carried through the cables 38 themselves or through a separate control cable (not shown).

To remove a bin 10 from the top of a stack 12, the load handling device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 15(c). The gripper plate 39 grips the bin 10, and is then pulled upwards on the cables 38, with the bin 10 attached. At the top of its vertical travel, the bin 10 is accommodated within the vehicle body 32 and is held above the level of the rails 22. In this way, the load handling device 30 can be moved to a different position in the X-Y plane, carrying the bin 10 along with it, to transport the bin 10 to another location. The cables 38 are long enough to allow the load handling device 30 to retrieve and place bins from any level of a stack 12, including the floor level. The vehicle 32 is sufficiently heavy to counterbalance the weight of the bin 10 and to remain stable during the lifting process. The weight of the vehicle 32 may be comprised in part of batteries that are used to power the drive mechanism for the wheels 34, 36. As shown in FIG. 16, a plurality of identical load handling devices 30 are provided, so that each load handling device 30 can operate simultaneously to increase the throughput of the system. The system illustrated in FIG. 16 includes two specific locations, known as ports 24, at which bins 10 can be transferred into or out of the system. An additional conveyor system (not shown) is associated with each port 24, so that bins 10 transported to a port 24 by a load handling device 30 can be transferred to another location by the conveyor system, for example to a picking station (not shown). Similarly, bins 10 can be moved by the conveyor system to a port 24 from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10 ("target bin") that is not located on the top of a stack 12, then the overlying bins 10 ("non-target bins") must first be moved to allow access to the target bin 10. This is achieved in an operation referred to hereafter as "digging".

Referring to FIG. 16, during a digging operation, one of the load handling devices 30 sequentially lifts each non-target bin 10a from the stack 12 containing the target bin 10b and places it in a vacant position within another stack 12. The target bin 10b can then be accessed by the load handling device 30 and moved to a port 24 for further transportation.

Each of the load handling devices 30 is under the control of a central computer which may be envisaged as the controller according to the first embodiment. Each individual bin 10 in the system is tracked, so that the appropriate bins 10 can be retrieved, transported and replaced as necessary. For example, during a digging operation, the locations of each of the non-target bins 10a is logged, so that the non-target bins 10a can be tracked.

The system described with reference to FIGS. 13 to 16 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10b is not at the top of a stack 12.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A controller configured to control movement of a plurality of transporting devices, the plurality of transporting devices being arranged to transport containers, the containers being stored in a facility, the facility being arranged to store the containers in a plurality of stacks, the facility having a plurality of pathways arranged in cells so as to form a grid-like structure above the stacks, wherein the grid-like structure extends in a first direction and in a second direction, the plurality of transporting devices being arranged to operate on the grid-like structure, the controller comprising:
a route determination unit configured to determine a route from one location on the grid-like structure to another location on the grid-like structure for each transporting device;
a clearance unit configured to provide clearance for each transporting device to traverse a portion of the determined route;
a constraint area determination unit configured to determine a plurality of constraint areas based on the grid-like structure; and
a calculation unit configured to calculate a constraint limit in each constraint area,
wherein at least one or more of:
the clearance unit is configured to grant or withhold clearance to a transporting device to traverse a portion of a determined route based on a calculated constraint limit in a particular constraint area, or
the route determination unit is configured to determine a route for a transporting device from one location to another location traversing or not traversing a particular constraint area based on a calculated constraint limit in a particular constraint area.

2. The controller according to claim 1, wherein the constraint area determination unit is configured to determine constraint areas based on one or more of a structural analysis or fatigue analysis of at least one of the grid-like structure, any mezzanines associated with the grid-like structure, or any peripherals associated with the grid-like structure.

3. The controller according to claim 1, wherein the constraint area is a constraint area extending across the entire grid-like structure.

4. The controller according to claim 1, wherein the constraint area determination unit is configured to determine constraint areas formed from a predetermined number of cells in a first direction and a predetermined number of cells in a second direction.

5. The controller according to claim 1, wherein each constraint area is determined so as to overlap with at least one other constraint area.

6. The controller according to claim 1, wherein at least one or more of:
the clearance unit is configured to withhold clearance to a transporting device to traverse a portion of a determined route when the constraint limit in a particular constraint area is greater than or equal to a predetermined threshold, and grant clearance to a transporting device to traverse the portion of the determined route when the constraint limit in the particular constraint area is less than a predetermined threshold; or
the route determination unit is configured to determine a route for a transporting device from one location to another location not traversing a particular constraint area when the calculated constraint limit in the particular constraint area is greater than or equal to a predetermined threshold, and determine a route for a transporting device from one location to another location traversing a particular constraint area when the calculated constraint limit in the particular constraint area is less than a predetermined threshold.

7. The controller according to claim 1, wherein the calculation unit is configured to calculate the constraint limit based on a number of transporting devices in a particular constraint area.

8. The controller according to claim 1, wherein the calculation unit is configured to calculate the constraint limit based on a number of transporting devices moving or accelerating in a first direction in a particular constraint area.

9. The controller according to claim 8, wherein the calculation unit is configured to calculate the constraint limit based on a number of transporting devices moving or accelerating in a second direction in a particular constraint area.

10. The controller according to claim 1, wherein the calculation unit is configured to calculate the constraint limit based on a expected force exerted on a particular constraint area from transporting devices accelerating or decelerating in a first direction.

11. The controller according to claim 1, wherein the calculation unit is configured to calculate the constraint limit based in a expected force exerted on a particular constraint area from transporting devices accelerating or decelerating in a second direction.

12. The controller according to claim 10, wherein the calculation unit is configured to calculate an expected force exerted on a particular constraint area based on at least one or more of: a direction of motion of each transporting device, a mass of a transporting device, a mass of a payload carried by a transporting device, an expected acceleration profile of a transporting device, an expected deceleration profile of a transporting device, a possibility of the plurality of transporting devices on the grid-like structure being commanded to stop at the same time, or a possibility of any one of the plurality of transporting devices on the grid-like structure being commanded to stop at any arbitrary time.

13. The controller according to claim 1, wherein, when the clearance unit determines to withhold clearance to a transporting device, the route determination unit is configured to perform at least one or more of: re-determining a route of the transporting device, re-determining routes of at least two of the plurality of transporting devices, performing a controlled stop of the transporting device, or performing a controlled stop of at least two of the plurality of transporting devices.

14. The controller according to claim 1, wherein the calculation unit is configured to determine a number of transporting devices in response to a status report received from each transporting device.

15. The controller according to claim 1, the controller comprising:
a movement control unit configured to control movement of the plurality of transporting devices.

16. The controller according to claim 1, wherein the controller is configured to prevent loads or fatigue which would risk human safety.

17. The controller according to claim 1 in combination with a storage system, wherein:
the facility comprises a first set of parallel rails or tracks extending in an X-direction, and a second set of parallel rails or tracks extending in a Y-direction transverse to the first set in a substantially horizontal plane to form the plurality of pathways and the grid-like structure above the stacks, the grid-like structure having a plurality of grid spaces;
the plurality of stacks of containers is arranged such that each stack is located within a footprint of a single grid space;
each transporting device is configured to selectively move laterally in the X and Y directions, above the stacks on the rails.

18. The controller according to claim 17, wherein each transporting device has a footprint that occupies only a single grid space in the storage system, such that each transporting device does not obstruct other transporting devices occupying or traversing adjacent grid spaces in the X and Y directions.

19. A method of controlling movement of a plurality of transporting devices, the plurality of transporting devices being arranged to transport containers, the containers being stored in a facility, the facility being arranged to store the containers in a plurality of stacks, the facility including a plurality of pathways arranged in cells so as to form a grid-like structure above the stacks, wherein the grid-like structure extends in a first direction and in a second direction, the plurality of transporting devices arranged to operate on the grid-like structure, the method comprising:
determining a plurality of constraint areas based on the grid-like structure;
calculating a constraint limit in each constraint area;
determining a route for each transporting device from one location on the grid-like structure to another location on the grid-like structure traversing or not traversing a particular constraint area; and
granting or withholding clearance to each transporting device to traverse a portion of a determined route,
wherein at least one or more of the determining a route step, or the granting or withholding clearance, is based on the calculated constraint limit in the particular constraint area.

20. The method according to claim 19, wherein the determining the plurality of constraint areas determines constraint areas based on one or more of a structural analysis or fatigue analysis of at least one or more of the grid-like structure, any mezzanines associated with the grid-like structure, or any peripherals associated with the grid-like structure.

21. The method according to claim 19, wherein the determined constraint areas comprise:
a constraint area extending across the entire grid-like structure.

22. The method according to claim 19, wherein the determining the plurality of constraint areas determines constraint areas formed from a predetermined number of cells in the first direction and a predetermined number of cells in the second direction.

23. The method according to claim 19, wherein each constraint area is determined so as to overlap with at least one other constraint area.

24. The method according to claim 19, wherein the method comprises at least one or more of:
withholding clearance to a transporting device to traverse a portion of the determined route when the constraint limit in a particular constraint area is greater than or equal to a predetermined threshold, and granting clearance to a transporting device to traverse the portion of the determined route when the constraint limit in the particular constraint area is less than a predetermined threshold; or
determining a route for a transporting device from one location to another location not traversing a particular constraint area when the calculated constraint limit in the particular constraint area is greater than or equal to a predetermined threshold, and determining a route for a transporting device from one location to another location traversing a particular constraint area when the calculated constraint limit in the particular constraint area is less than a predetermined threshold.

25. The method according to claim 19, wherein the calculating includes calculating the constraint limit based on a number of transporting devices in a particular constraint area.

26. The method according to claim 19, wherein the calculating includes calculating the constraint limit based on a number of transporting devices moving or accelerating in the first direction in a particular constraint area.

27. The method according to claim 26, wherein the calculating includes calculating the constraint limit based on a number of transporting devices moving or accelerating in the second direction in a particular constraint area.

28. The method according to claim 19, wherein the calculating includes calculating the constraint limit based on an expected force exerted on a particular constraint area from transporting devices accelerating or decelerating in the first direction.

29. The method according to claim 19, wherein the calculating includes calculating the constraint limit based on the expected force exerted on a particular constraint area from the transporting devices accelerating or decelerating in the second direction.

30. The method according to claim 28, wherein the calculating includes calculating an expected force exerted on a particular constraint area based on at least one or more of: a direction of motion of each transporting device, a mass of a transporting device, a mass of a payload carried by a transporting device, an expected acceleration profile of a transporting device, an expected deceleration profile of a transporting device, a possibility of the plurality of transporting devices on the grid-like structure being commanded to stop at the same time, or a possibility of any one of the plurality of transporting devices on the grid-like structure being commanded to stop at any arbitrary time.

31. The method according to claim 19, wherein, when the granting or withholding of clearance withholds clearance to a transporting device, the determining a route performs at least one or more of: re-determining the route of the transporting device, re-determining the routes of at least two of the plurality of transporting devices, performing a controlled stop of the transporting device, or performing a controlled stop of at least two of the plurality of transporting devices.

32. The method according to claim 19, wherein the calculating includes determining a number of transporting devices in response to a status report received from each transporting device.

33. The method according to claim 19, the method comprising:
   controlling movement of the plurality of transporting devices.

34. The method according to claim 19, wherein the method is performed for preventing one or more of load or fatigue that risk human safety.

* * * * *